(12) United States Patent
Gray et al.

(10) Patent No.: US 9,247,687 B2
(45) Date of Patent: Feb. 2, 2016

(54) HYDRAULICALLY CONTROLLED ROTARY HARROW FOR TILLAGE APPARATUS AND SYSTEM

(71) Applicant: Salford Farm Machinery Ltd., Salford (CA)

(72) Inventors: Geof Gray, Burford (CA); Jake Rozendaal, Delhi (CA); Frens Hoeve, Tillsonburg (CA); John Mark Averink, Norwich (CA)

(73) Assignee: Salford Group Inc., Salford (CA)

( * ) Notice: Subject to any disclaimer, the term of this patent is extended or adjusted under 35 U.S.C. 154(b) by 129 days.

(21) Appl. No.: 14/202,594

(22) Filed: Mar. 10, 2014

(65) Prior Publication Data

US 2014/0251646 A1 Sep. 11, 2014

Related U.S. Application Data

(60) Provisional application No. 61/776,764, filed on Mar. 11, 2013, provisional application No. 61/823,293, filed on May 14, 2013.

(51) Int. Cl.
*A01B 61/04* (2006.01)
*A01B 29/04* (2006.01)
*A01B 49/02* (2006.01)

(52) U.S. Cl.
CPC ............. *A01B 61/044* (2013.01); *A01B 29/048* (2013.01); *A01B 49/027* (2013.01)

(58) Field of Classification Search
USPC ................................ 172/260.5, 264, 544, 551
See application file for complete search history.

(56) References Cited

U.S. PATENT DOCUMENTS

| | | | |
|---|---|---|---|
| 3,575,243 A * | 4/1971 | Mark et al. ..................... | 172/710 |
| 4,194,575 A * | 3/1980 | Whalen ......................... | 172/551 |
| 4,209,067 A | 6/1980 | Poggemiller et al. | |
| 4,353,423 A | 10/1982 | Poggemiller et al. | |
| 4,418,761 A * | 12/1983 | Dietrich et al. ................ | 172/271 |
| 4,422,511 A | 12/1983 | Poggemiller et al. | |
| 4,600,060 A | 7/1986 | Winter et al. | |
| 5,065,681 A | 11/1991 | Hadley | |
| 5,562,165 A | 10/1996 | Janelle et al. | |
| 5,954,139 A | 9/1999 | Forsyth | |
| 7,762,345 B2 | 7/2010 | Rozendaal et al. | |
| 7,766,093 B2 | 8/2010 | Becker et al. | |
| 8,196,672 B2 * | 6/2012 | Rozendaal et al. ........... | 172/573 |

(Continued)

FOREIGN PATENT DOCUMENTS

CA 1077763 5/1980
WO 8607521 12/1986

*Primary Examiner* — Gary Hartmann
(74) *Attorney, Agent, or Firm* — Brunet & Co. Ltd.; Robert A. H. Brunet

(57) ABSTRACT

A tillage apparatus having a rotary harrow mounted thereon with mounting elements utilizes a cooperative combination of: a compressible material at the mounting element to permit relative motion between the harrow and the mounting element in response to a motion of the harrow; and, a hydraulic actuator operated under a first pressure to lower the rotary harrow and maintain engagement of the rotary harrow with the ground. A pressure relief element is utilized to reduce back pressure in response to the harrow striking a hard impediment on the ground during operation of the tillage apparatus in a field. The combination cooperates to reduce damage to the harrow and/or other parts of the tillage apparatus when the harrow strikes a hard impediment such as a rock.

20 Claims, 26 Drawing Sheets

(56) References Cited

U.S. PATENT DOCUMENTS

| | | |
|---|---|---|
| 8,307,909 B1 | 11/2012 | Rozendaal et al. |
| 2013/0062083 A1 | 3/2013 | Casper et al. |
| 2014/0054051 A1* | 2/2014 | Landoll et al. ................ 172/170 |
| 2014/0262365 A1* | 9/2014 | Claussen .......................... 172/1 |
| 2015/0250088 A1* | 9/2015 | Sandberg .......................... 172/1 |

* cited by examiner

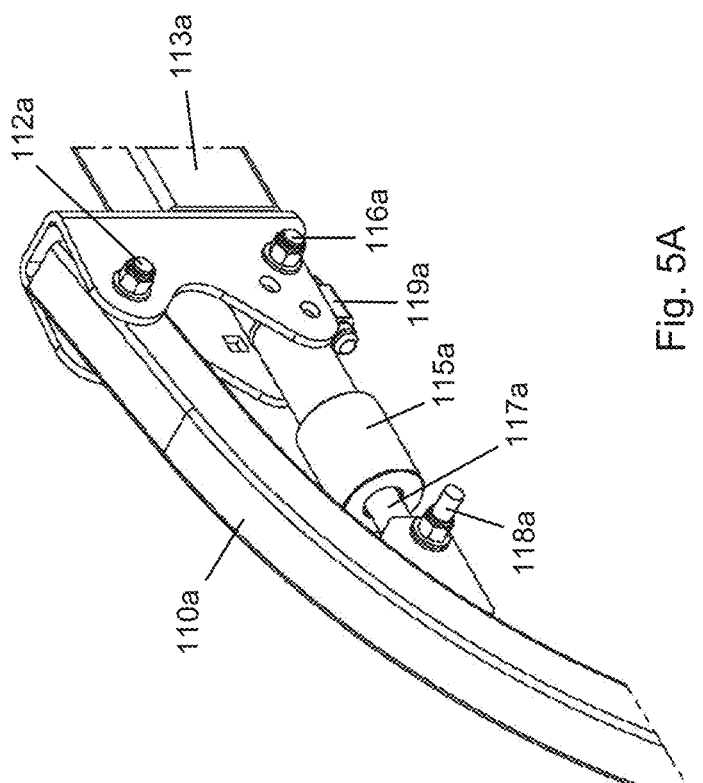
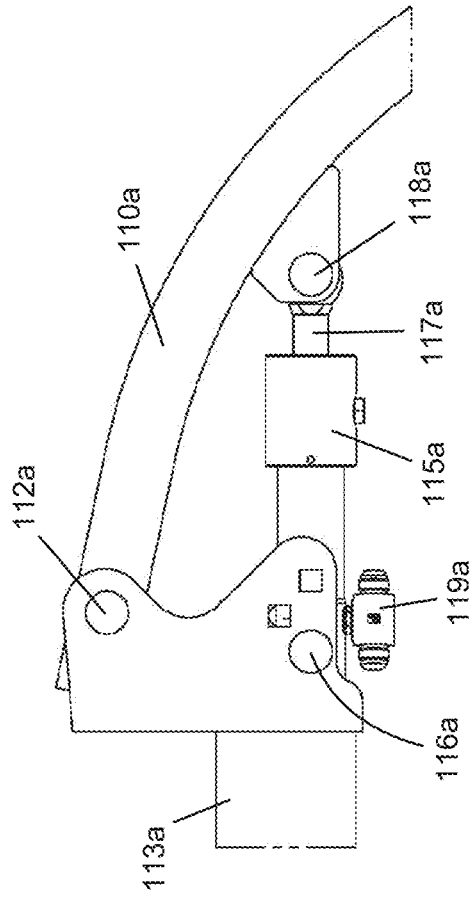
Fig. 5A
Fig. 5B

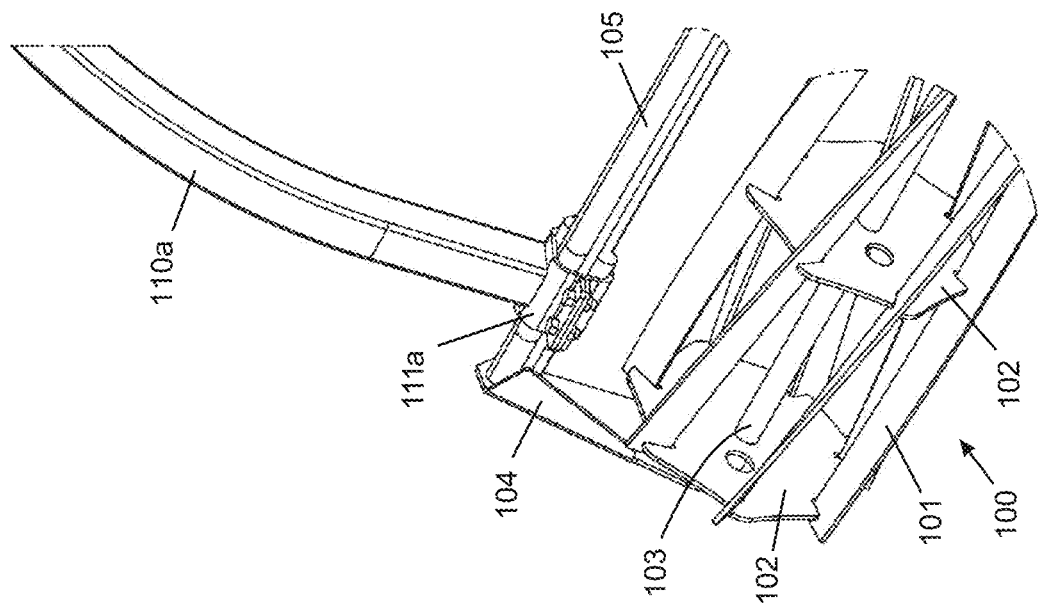
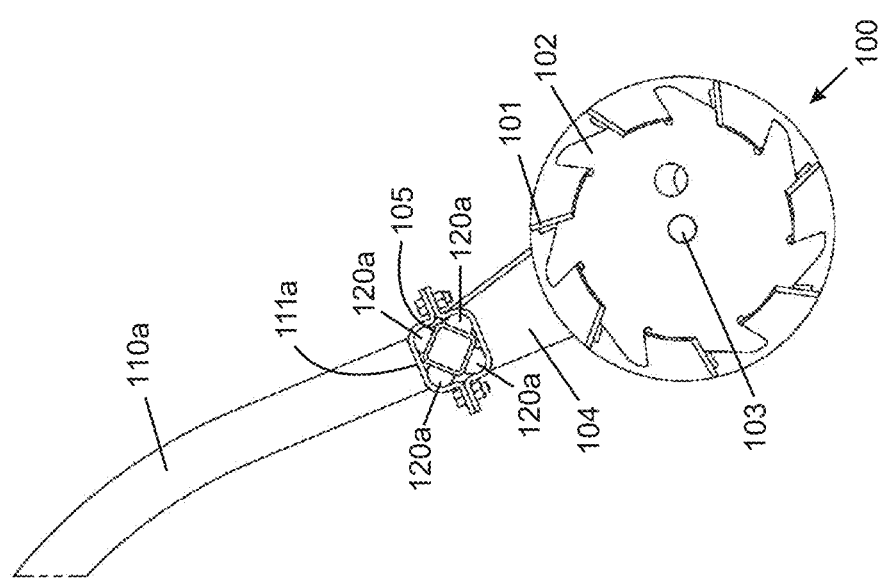

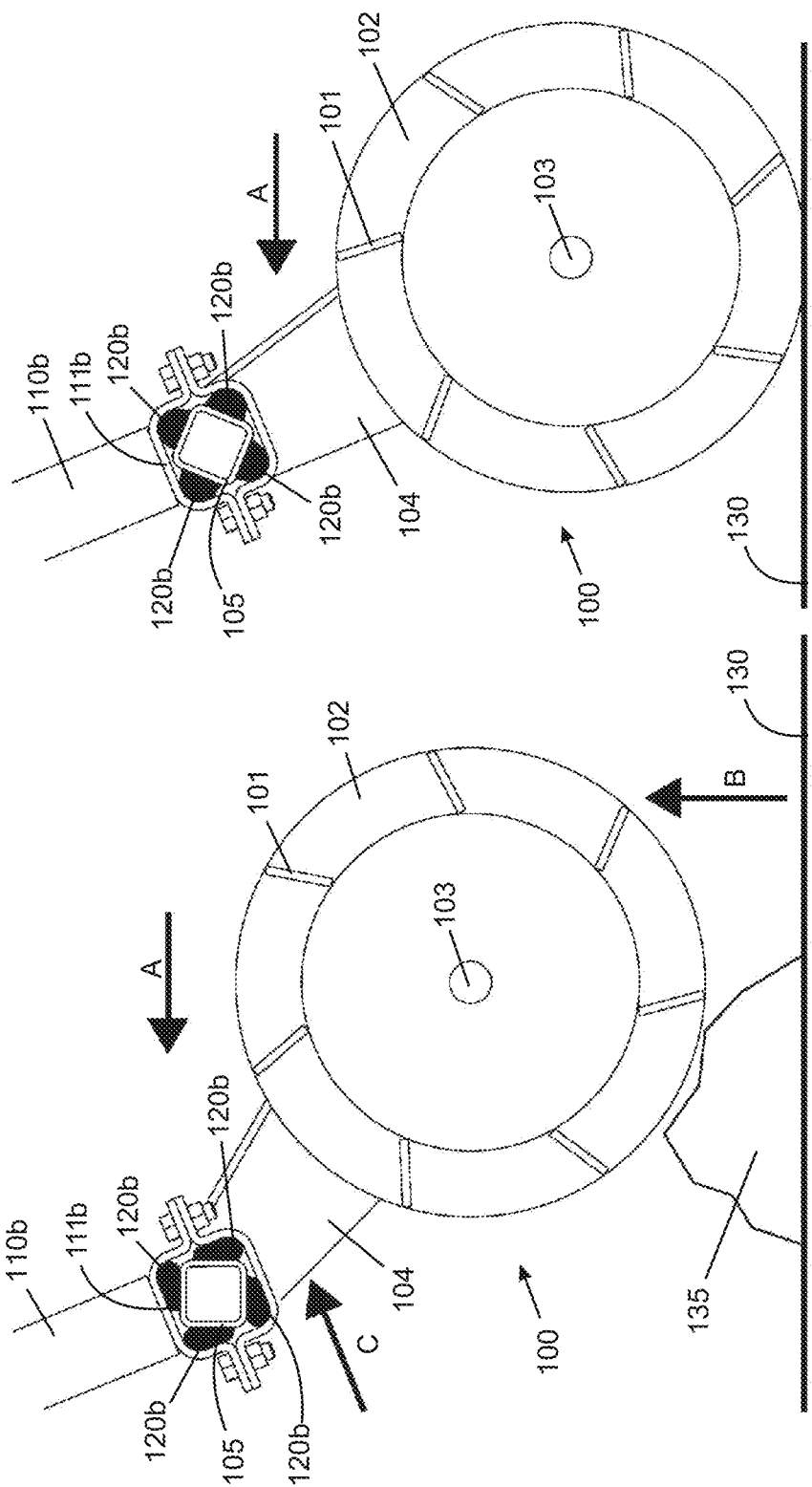

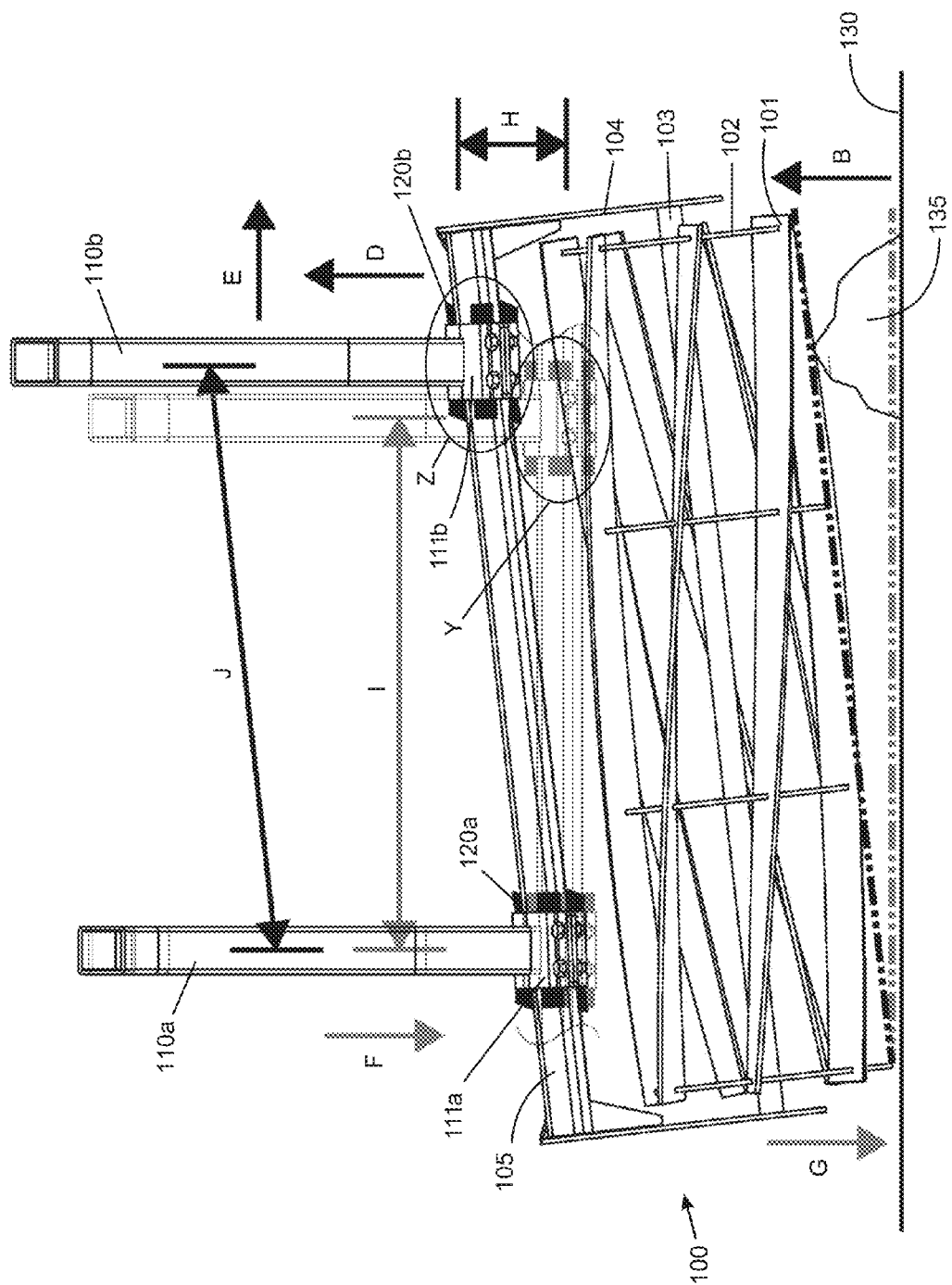

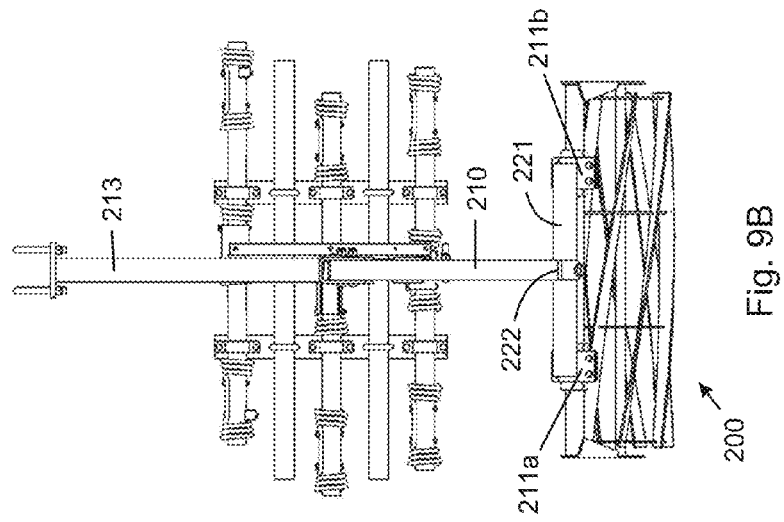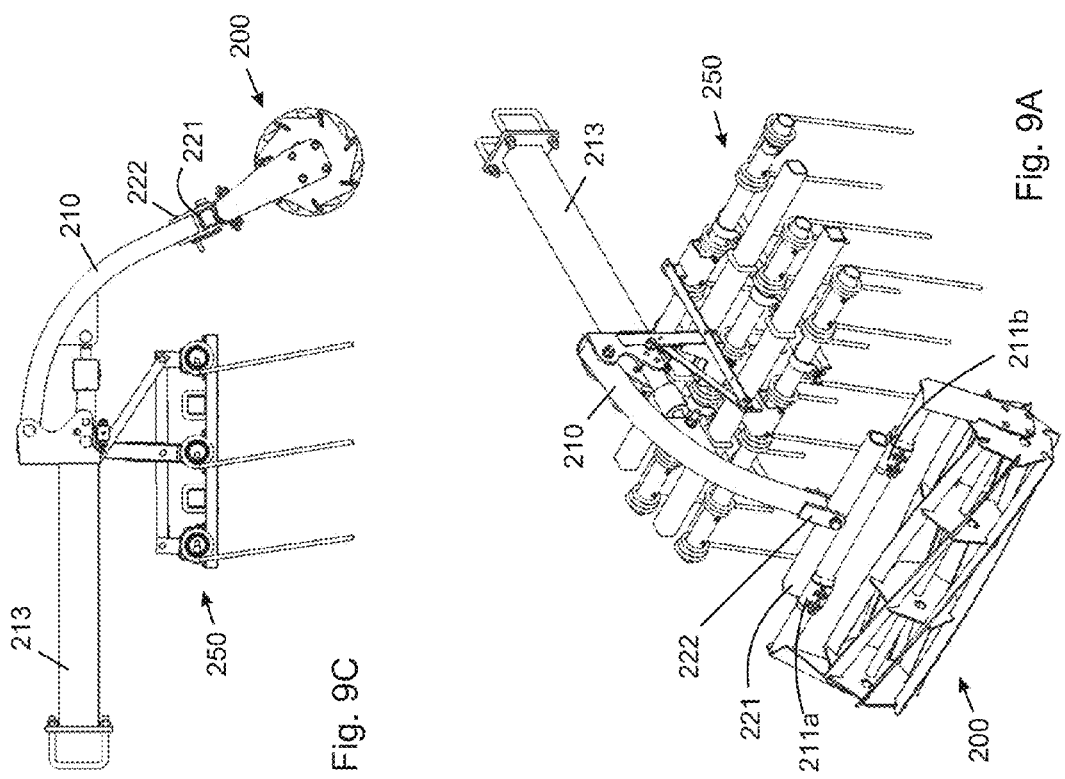

HYDRAULICALLY CONTROLLED ROTARY HARROW FOR TILLAGE APPARATUS AND SYSTEM

CROSS-REFERENCE TO RELATED APPLICATIONS

This application claims the benefit of United States Provisional Patent Applications U.S. Ser. No. 61/776,764 filed Mar. 11, 2013 and U.S. Ser. No. 61/823,293 filed May 14, 2013, the entire contents of both of which are herein incorporated by reference.

FIELD OF THE INVENTION

The present invention relates to an apparatus, system and method for tilling a field. In particular, the present invention relates to control of a rotary harrow, especially as part of an apparatus, system and method for a conservation tillage strategy.

BACKGROUND OF THE INVENTION

Apparatuses, systems and methods for tilling agricultural fields are very well known in the art. Apparatuses typically comprise a cultivator frame having multiple and various tilling attachments attached thereto, laid out on the frame in a variety of patterns to maximize the desired tilling effect. The apparatus is dragged behind a vehicle during the tilling operation.

In particular, conservation tillage, or vertical tillage as it is sometimes called, has recently become a tilling strategy of choice in many instances. Conservation tillage minimally disturbs the soil prior to planting in order to allow air to penetrate the mat of crop residue left in the field from the previous harvest. Apparatuses, systems and methods for conservation tillage are known in the art, for example U.S. Pat. No. 7,762,345 issued Jul. 27, 2010, U.S. Pat. No. 8,113,295 issued Feb. 14, 2012, U.S. Pat. No. 8,196,672 issue Jun. 12, 2012, U.S. Pat. No. 8,307,908 issued Nov. 13, 2012 and U.S. Pat. No. 8,307,909 issued Nov. 13, 2012, the entire contents of all of which are herein incorporated by reference.

In addition to coulter wheels, chisel plows, V-shaped shovels, sub-soiling teeth and other field working tools, a tillage apparatus may comprise leveling attachments at the rear of the cultivator frame. The leveling attachments may be mounted to a rear transverse cross-member of the frame. Leveling attachments may comprise, for example, spike harrows, leveling bars, rotary harrows, etc., which are dragged behind the cultivator frame to level the field after the field is worked by the field working tools.

A conservation tillage apparatus may be drawn at faster speeds than conventional tillage apparatuses. Although there is no theoretical upper limit on speed, conservation tillage apparatuses may be operated at speeds of from 8-18 miles per hour. Operating at such faster speeds causes the crop residue to be cut more finely and reduces the likelihood of becoming stuck in wet soil conditions. However, operating at faster speeds, especially above 12 miles per hour, can create significant problems and damage when leveling attachments being dragged behind the cultivator frame encounter a hard impediment, such as a rock. This is especially true for rotary harrows.

Harrows are implements comprising sets of teeth, tines or ridges that when dragged over ploughed land break up clods, remove weeds, and cover seed. A rotary harrow is a harrow with one or more turning wheels or drums rimmed with spikes or ridges. The turning wheels or drums are mounted in a relatively long basket. The basket of the rotary harrow is typically immovably mounted to a rear transverse crossmember of the cultivator frame. When a rotary harrow hits a hard impediment, the point of impact will be a relatively localized point along the entire length of the harrow. The impact will cause the harrow to deflect upwards at this point. In addition to translating upwards applying forces or stresses against the immovable mounting, the deflection will cause the relatively long harrow to pivot or twist around an axis causing the harrow to twist against its mountings. At high speeds, the upward and twisting forces caused when the harrow hits the hard impediment can be large enough to damage the harrow, the cultivator frame or both.

Some attempts have been made to overcome this problem. U.S. Pat. No. 7,766,093 issued Aug. 3, 2010, the entire contents of which is herein incorporated by reference, describes a hydraulically lift rolling basket structure for a tillage implement. The rolling basket structure includes an arm structure pivotally connected to the aft end of tine support members fixed to the rear of the implement frame. Hydraulic cylinders connected between the support members and the arm structure provides quick on-the-go disengagement of the rolling basket with the ground, for example, when wet or sticky ground conditions or the like are encountered. A cylinder lost motion connection facilitates movement of the baskets over ground irregularities and obstacles without operation of the cylinders. In this arrangement, the hydraulic cylinders may be actuated to raise the rolling basket over wet ground and the lost motion connection permits upward motion of the entire rolling basket when any part of it encounters a hard impediment. The lost motion connection comprises a pin in a curved slot that allows some vertical play over the entire length of the basket when it encounters a hard impediment. However, because the entire basket is raised when a hard impediment is encountered, the rotary harrow will fail to level significant areas of the field due to the impact of relatively small hard impediments.

There remains a need for means of reducing damage to a rotary harrow and/or cultivator frame when the harrow encounters a hard impediment in a field while being dragged behind a tillage apparatus, while at the same time maximizing the effectiveness of the harrow at leveling the field.

SUMMARY OF THE INVENTION

According to the present invention, there is provided a tillage apparatus for tilling ground, the tillage apparatus comprising a cultivator frame and a rotary harrow mounted to the frame, the rotary harrow comprising a basket and at least one rotating harrow structure mounted in the basket, the basket mounted to a mounting element with compressible material at the mounting element, the compressible material permitting relative motion between the basket and the mounting element in response to a motion of the rotary harrow, the mounting element mounted to the frame, the mounting element operatively connected to a hydraulic actuator whose operation raises and lowers the mounting element thereby raising and lowering the rotary harrow, and a pressure relief element for reducing back pressure caused by deflection of the rotary harrow.

According to another aspect of the invention, there is provided a kit for making a tillage apparatus as described previously from an existing cultivator frame and rotary harrow, the kit comprising: a hydraulic system including a hydraulic actuator, the hydraulic system able to provide a first pressure to the hydraulic actuator for lowering the rotary harrow and maintaining engagement of the rotary harrow with the ground; a mounting element for mounting the rotary harrow to the cultivator frame, the mounting element for operative connection to the hydraulic actuator; compressible material for permitting relative motion between the rotary harrow and the mounting element in response to a motion of the rotary harrow when the rotary harrow is mounted on the mounting element; a pressure relief element for reducing back pressure caused by deflection of the rotary harrow; and, a set of instructions for assembling the mounting element, rotary harrow, hydraulic system, compressible material and pressure relief element on the cultivator frame.

According to another aspect of the invention, there is provided a method of leveling a field comprising: providing a rotary harrow mounted on a tillage apparatus, the harrow mounted on the tillage apparatus with a mounting element and compressible material at the mounting element to permit relative motion between the mounting element and the rotary harrow in response to the rotary harrow striking a hard impediment in the field; applying a force to the rotary harrow with a hydraulic actuator operated at a first pressure to engage the rotary harrow with the field; providing a pressure relief element to reduce back pressure caused by the rotary harrow striking a hard impediment in the field; and, dragging the tillage apparatus across the field.

The cultivator frame has a longitudinal axis in the direction of motion of the tillage apparatus as it is being dragged across the ground. The longitudinal axis runs from front to rear (or rear to front) of the frame. The cultivator frame has a transverse axis that is perpendicular to the longitudinal axis and runs left to right (or right to left) of the frame. The front end of the frame is mounted to the transportation (e.g. vehicle) that drags the apparatus. The cultivator frame may have having a plurality of longitudinally spaced apart transverse frame-members and a plurality of transversely spaced apart longitudinal frame-members.

The rotary harrow may be any manner of rotary harrow, including rotary packers. The rotating harrow structure may be rotating wheels or drums having spikes or ridges. One or more rotating harrow structures are mounted in a basket to form the rotary harrow. The basket may comprise axle mounting plates for mounting a rotatable axle and one or more support elements for mounting the basket on the cultivator frame.

There may be one or more rotary harrows mounted on the cultivator frame. A plurality (gang) of rotary harrows may be mounted transversely and/or longitudinally in respect of each other. One or more of the rotary harrows may be mounted on the frame in conjunction with compressible material and hydraulic actuators as described herein. The one or more rotary harrows are preferably mounted on a transverse frame-member of the cultivator frame, preferably with at least one of the rotary harrows mounted on a rearmost transverse frame-member.

The compressible material at the mounting element permits relative motion between the basket and the mounting element in response to a motion of the rotary harrow. Thus, the compressible material is positioned somewhere at the mounting element where it can provide a cushion between the rotary harrow and the mounting element. When the rotary harrow strikes a hard impediment (e.g. a rock) it will first deflect upward and will then deflect downward after clearing the impediment. In both the upward and downward deflection, the compressible material will be compressed absorbing some of the forces experienced by the harrow and mounting element thereby aiding the hydraulic actuator in protecting the harrow and mounting element. Further, when only one side of the rotary harrow strikes a hard impediment it deflects upward in relation to the other side. Thus, the harrow pivots around the longitudinal axis in a twisting motion. Not only does this result in compressive forces upward and downward but also results in sideways forces. The compressible material is also able to alleviate some of these sideways forces by compressing and elongating in an appropriate direction. Thus, compression and elongation of the compressible material permits some relative motion between the basket and the mounting element in both the vertical and horizontal directions, thereby relieving some of the stresses caused by the various motions of the harrow after it strikes a hard impediment.

The compressible material is preferably an elastomer, for example a natural or synthetic rubber, for example a nitrile rubber. The compressible material may be in the form of one or more bushings. One or more support elements of the basket may be mounted on the mounting element. The mounting element may comprise one or more receiving elements for the basket. There may be one or more than one mounting element per basket, for example two, three, four or more mounting elements. There are preferably two mounting elements per basket. The mounting elements are preferably symmetrically disposed on the basket. When there is one mounting element, the mounting element is preferably centered transversely on the basket. When there are two mounting elements, the two mounting elements are preferably disposed transversely on the basket equidistant from the longitudinal centerline of the basket. The mounting element is preferably a mounting arm. The one or more receiving elements for the basket may be one or more mounting brackets. The one or more support elements of the basket may be one or more basket arms. In preferred embodiments, the compressible material may be between the one or more basket arms and the mounting brackets or between the mounting brackets and mounting arms.

The compressible material comprises a thickness, which provides a suitably sufficient range of motion for the type of material used. The thickness may be, for example, in a range of 0.75-2 inches, e.g. 1.25 inches. Thicker material provides a greater range of motion. The compressibility of the material is related to the Shore A hardness and the area of the material. The Shore A hardness of the material may be in a range of 55-100, particularly 65-90, for example 70, as measured on a durometer. Materials with lower Shore A hardness are softer, which permits greater relative motion between the basket and the mounting element.

The hydraulic actuator may be any hydraulic device that is capable of providing mechanical work in response to fluid pressure in the device. A hydraulic cylinder is one example, preferably a double acting hydraulic cylinder. In one embodiment, the hydraulic actuator is preferably a rephasing hydraulic cylinder. There may be one or more than one hydraulic actuator, preferably two, three, four or more. When there is one hydraulic actuator, the hydraulic actuator is preferably centered transversely on the basket. When there are two hydraulic actuators, the two hydraulic actuators are preferably disposed transversely on the basket equidistant from the longitudinal centerline of the basket. In one embodiment, there are preferably two hydraulic actuators per basket. In one embodiment, there is preferably one hydraulic actuator per mounting element. When one or more baskets are mounted to a tool bar through the mounting elements, it may be preferable to use an actuator mounted to the tool bar, whereby the mounting elements are operatively connected to the hydraulic actuator through the tool bar. Two or more hydraulic actuators may be mounted to the tool bar, in which case the hydraulic actuators are preferably symmetrically disposed on the toll bar.

Operation of the hydraulic actuator raises and lowers the mounting element. The mounting element may be mounted directly to the frame or the mounting element may be mounted to the frame through one or more intermediary structures. For example, the mounting element may be mounted to an additional support member, the additional support member mounted to the frame, or the mounting element may be mounted to a tool bar, the tool bar forming a common structure for mounting a plurality of mounting elements, and the tool bar being mounted to the frame through additional support members. Tool bars are preferably transversely oriented and may form a sub-frame on which various other tillage tools may be mounted in addition to the rotary harrow. The mounting element is preferably pivotally mounted to permit upward and downward motion relative to the structure to which the mounting element is mounted. In one arrangement, the hydraulic actuator is mounted directly on the frame and is mechanically connected to the mounting element, and the mounting element is movably mounted, for example pivotally mounted, directly on the frame to permit upward and downward motion of the mounting element. In another arrangement, there may an additional supporting element rigidly mounted to the frame, with the hydraulic actuator and mounting element mounted to the additional supporting element.

The hydraulic actuator's principle function is to apply a force on the mounting element to provide a force on the rotary harrow to maintain engagement of the harrow with the ground. A hydraulic system associated with the hydraulic actuator can accomplish this in any suitable manner, for example with a closed system or an adjustable constant flow pressure reduce valve appropriately placed in the hydraulic circuit. The hydraulic system is set to provide the first pressure, which is the pressure at which the hydraulic actuator is operated to lower the rotary harrow and maintain engagement of the rotary harrow with the ground. The first pressure may be set to achieve an appropriate force per mounting element. The force per mounting element may be 100-450 pounds, for example 150 pounds. Depending on hydraulic line diameters, size of the hydraulic actuator and other aspects of the hydraulic system, the first pressure may be in a range of 1000-4500 psi, for example.

When the rotary harrow strikes a hard impediment, the harrow tries to deflect upward creating a back pressure in the actuator. In a normal hydraulic system, forward pressure would be increased to compensate, which would increase downward forces and strain on the mounting element and harrow and increase the possibility of damage thereto since the harrow would not be allowed to rise in response to striking the hard impediment.

However, in the present invention there is a pressure relief element for reducing back pressure caused by deflection of the rotary harrow. The pressure relief element preferably comprises a relief valve in fluid communication with the hydraulic actuator or a resilient member mounted to the mounting element.

In the case of a relief valve, the relief valve is set a second pressure. When the fluid pressure in the actuator increases beyond the second pressure, the relief valve opens permitting flow of fluid out of the actuator, for example into the hydraulic lines on the other side of the actuator where it can flow toward the other side of the actuator and/or back to the hydraulic pump. With the pressure in the actuator relieved, the actuator allows the mounting element and the harrow to rise in response to the harrow striking the hard impediment, thereby relieving strain on the mounting element and harrow. Once the harrow is over the hard impediment, the hydraulic system may permit hydraulic fluid to flood back into the actuators to maintain the first pressure. The second pressure may be adjustable depending on circumstance and is preferably set to correspond to a force per mounting element that is at least 10 pounds greater, for example 10-100 pounds greater, than the force per mounting element achieved by the first pressure. Depending on hydraulic line diameters, size of the hydraulic actuator and other aspects of the hydraulic system, the second pressure may be in a range of 100-1000 psi, for example.

In one embodiment where a single function relief valve is used, a hydraulic accumulator or like structure may be used to buffer back pressure caused when the harrow strikes a hard impediment. In this case, the relief valve may be further equipped with hydraulic circuitry to allow hydraulic fluid to flow back into the hydraulic actuator after the relief valve has been tripped. In another embodiment a constant flow pressure reduce valve may be used in conjunction with the relief valve to set and maintain the first pressure. In this case, the relief valve and the pressure reduce valve may be part of the same double function valve. Such a double function valve can work cooperatively to ensure that the first pressure is maintained during normal operation while relieving back pressure when the harrow strikes a hard impediment. In all of these embodiments, downward force on the harrow still increases to some degree while the harrow deflects upward until a plateau is reached. However, the increase in fluid pressure and downward force are mitigated so that pressure is relieved through the relief valve in only extreme situations. After the harrow is finished deflecting, the downward force and fluid pressure return to normal. If desired, but not required, geometry of the mounting elements may be carefully controlled in combination with a constant flow pressure reduce valve to maintain a constant downward force on the harrow during deflection.

One or more additional pressure relief mechanisms may also be employed. For example, one or more additional hydraulic accumulators (e.g. reservoirs for hydraulic fluid) and/or additional relief valves may be placed in the hydraulic circuit at appropriate points to service different harrows in a gang. Often, one harrow in a gang will strike a hard impediment while the others do not. Having an additional relief mechanism near the affected harrow would improve response time of the hydraulic actuator or actuators associated with that harrow, thereby further reducing the chance of potential damage. It would also mean that the hydraulic actuators associated with unaffected harrows would not need to respond thereby keeping those harrows in contact with ground. Any number or combination of other relief mechanisms may be used.

In the case of a resilient member, the resilient member may be configured to transfer ground engaging forces generated by the hydraulic cylinder to the rotary harrow and configured to resiliently deform to reduce back pressure caused by deflection of the harrow. The resilient member preferably comprises a spring, for example a tension spring, particularly a helical tension spring. Forces that keep the harrow engaged with the ground arise from hydraulic actuator and are transferred to the harrow through the resilient member, which is biased under the force of the harrow engaging the ground. The pressure in the hydraulic actuator may then be locked at a constant value greatly simplifying the hydraulic circuit. The pressure may be set to a desired level based on field conditions, and setting of the pressure may be accomplished remotely (from the vehicle cab or a central GPS operating system) without stopping the tillage operation. When the rotary harrow deflects, for example when it strikes a hard impediment, the hydraulic actuator does not need to compensate for back pressure because deflection of the harrow biases the resilient element further, which absorbs the back pressure while maintaining the necessary downward forces to keep the harrow engaged with the ground.

Where the pressure relief element comprises a resilient member, the hydraulic actuator preferably comprises two or more rephasing hydraulic cylinders. Rephasing hydraulic cylinders are two or more cylinders plumbed in series or parallel, with the bores and rods sized such that all rods extend and/or retract equally when hydraulic fluid flow is directed to the first, or last, cylinder within the hydraulic system. Preferably, the rephasing hydraulic cylinders are plumbed in series. In series applications, the bore and rod sizes are typically different, This hydraulic synchronization of rod positions eliminates the need for a flow divider in the hydraulic system, or any type of mechanical connection between the cylinder rods to achieve synchronization. When harrows are commonly used in high speed applications like vertical tillage, there is a durability limitation due to speed and obstacles encountered. When a rotary harrow hits an obstacle at high speed it will absorb a significant amount of energy that must not damage (e.g. break or fatigue) the frame and/or the harrow. Damage can happen when one side of the harrow hits a hard impediment and begins to bounce up while the mounting element on the other side of the harrow is holding it down. This is particularly a problem with prior art apparatuses that use springs to hold the harrow down. When this happens, both the weight of the harrow and the down-pressure applied by the springs react against this sudden force. When moving at more than 10 mph it takes only a small fraction of a second for the side of the harrow that hit the impediment to deflect out of the way of the impediment, thereby moving the other mounting element and rest of the harrow along with it, but at very poor leverage since the other mounting element is at the opposite side of the harrow. This can result in significant damage, especially to the mounting elements.

In the present invention, the compressible material compensates for some of the initial forces and allows the harrow to deflect and 'give' a little along the plane of the frame on which the mounting elements are mounted. Also, the hydraulic system with a relief valve allows the actuator to rapidly empty when the back pressure exceeds the second pressure, the second pressure being adjustable to whatever the operator desires. Or the hydraulic system in conjunction with a resilient member permits a constant downward force on the harrow while allowing the harrow to deflect safely under control of the resilient member. Thus, unlike in spring systems of the prior art, the hydraulic pressure does not continue to increase or increases only a little and well within the tolerances of the equipment. Furthermore, a constant flow pressure reduce valve circuit, when it is used, automatically pushes the arms back down when the harrow is past the impediment. These features can act cooperatively to reduce the possibility of damage to the mounting elements and/or harrow.

As discussed above in the case where the pressure relief element comprises a relief valve, the compressible material and hydraulic actuator work in tandem together to cooperatively compensate for the motion of the rotary harrow when it strikes a hard impediment. For this reason, a balance is preferably struck between the first and second pressures and the compressibility of the compressible material. When the compressible material is very compressible, a greater amount of motion may be accommodated by the compressible material. However, if the first pressure, and therefore also the second pressure, is set high, the compressible material will be forced to do all of the work as the back pressure in the actuator may not get high enough to open the relief valve. Conversely, if the compressible material is less compressible, a lesser amount of motion may be accommodated. In this circumstance, if the first pressure, and therefore also the second pressure, is set low, the relief valve will trip more often and the harrow will be too often disengaged from the ground. Therefore, when the compressible material is very compressible, lower first and second pressures are desirable, while when the compressible material is less compressible, higher first and second pressures are desirable.

Because the compressible material reacts faster than the pressure relief element in response to deflection of the harrow, the compressible material is preferably engineered to accommodate more of the back pressure than the pressure relief element when the harrow strikes a hard impediment. In practice, the maximum total force applied by one of the hydraulic actuators to the harrow as a result of the first pressure is set so that the compressibility of the material can accommodate between about one-half and three-quarters of the total maximum force during a deflection event. The remaining one-half to one-quarter is accommodated by the action of the pressure relief element. Preferably, the compressibility of the material can accommodate about two-thirds of the total maximum force, with the remaining one-third accommodated by the pressure relief element.

The tillage apparatus is preferably a conservation tillage apparatus. The tillage apparatus may have one or more other leveling attachments mounted thereon, for example spike harrows, leveling bars, other rotary harrows, etc. The tillage apparatus may have one or more field working tools mounted thereon, for example coulter wheels, chisel plows, V-shaped shovels, sub-soiling teeth, etc. Leveling attachments are generally mounted on the cultivator frame rearward of the field working tools.

Further features of the invention will be described or will become apparent in the course of the following detailed description.

BRIEF DESCRIPTION OF THE DRAWINGS

In order that the invention may be more clearly understood, embodiments thereof will now be described in detail by way of example, with reference to the accompanying drawings, in which:

FIG. 5A is a perspective close up view of a hydraulic cylinder mounted to a harrow supporting arm and connected to a pivoting mounting arm;

FIG. 5B is a side view of FIG. 5A;

FIG. 6A is a perspective partial close up view of a rotary harrow mounted to a mounting arm;

FIG. 6B is a side view of FIG. 6A;

FIG. 7A is a schematic side view of a rotary harrow mounted to a mounting arm while traveling over even ground and showing rubber material cushioning a basket arm within a mounting bracket on a mounting arm;

FIG. 7B shows how the rotary harrow and rubber material depicted in FIG. 7A deflect and deform, respectively, as the rotary harrow travels over a rock;

FIG. 7C is a rear end view of the rotary harrow depicted in FIGS. 7A and 7B showing position of the harrow before and during the traveling over the rock;

FIG. 9A is a perspective view of a single pivot embodiment of harrows mounted to a transverse frame-member of a cultivator frame;

FIG. 9B is a top view of FIG. 9A;

FIG. 9C is a side view of FIG. 9A;

DESCRIPTION OF PREFERRED EMBODIMENTS

Figure 1:
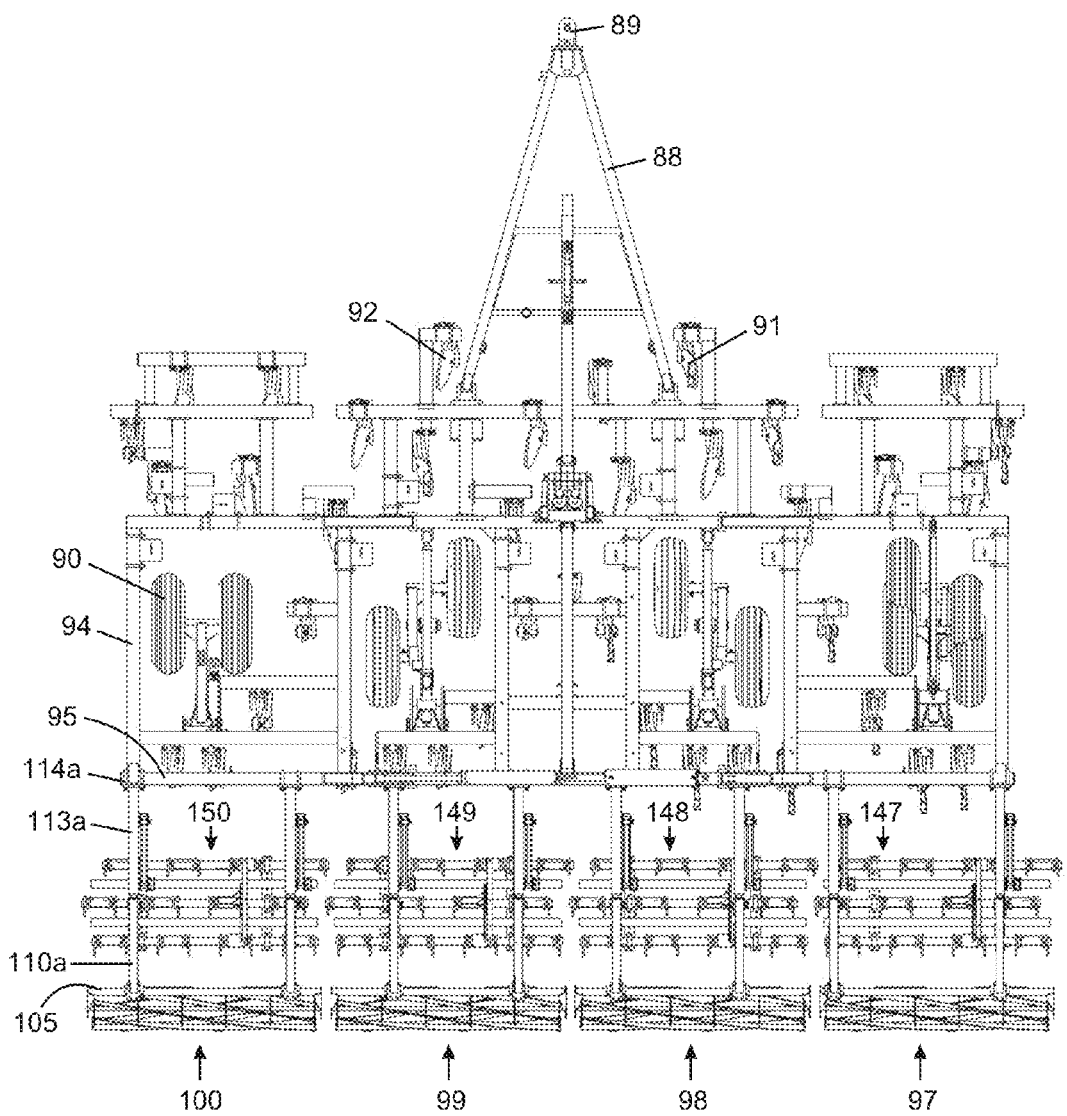
FIG. 1 is a top view of a tillage apparatus of the present invention having four harrow assemblies mounted to a transverse frame-member at a rear of a cultivator frame of the tillage apparatus.

FIG. 1 depicts a tillage apparatus having a gang of four harrow assemblies mounted to transverse frame-member 95 at a rear of cultivator frame 94 of the tillage apparatus. The tillage apparatus further comprises a plurality of field working tools such as coulter wheels 92 and chisel plows 91 (only one of each being labeled). The frame rides on eight wheels with rubber tires 90 (only one labeled) and is towed using tow bar 88 hitched to a tractor with hitch 89. The four harrow assemblies are mounted on transverse frame-member 95 through two harrow supporting arms per harrow assembly (only one labeled as 113a) with two mounting brackets per harrow assembly (only one labeled as 114a). The gang of four harrow assemblies comprises rotary harrows 100,99,98,97 and spike harrows 150,149,148,147. The four rotary harrows are mounted to the harrow supporting arms by two mounting arms per rotary harrow (only one labeled as 110a) mounted to a basket arm (only one labeled as 105) on a basket of each rotary harrow. Parts and operation of the harrow assemblies are described in more detail in connection with FIGS. 2-7.

Figure 2:
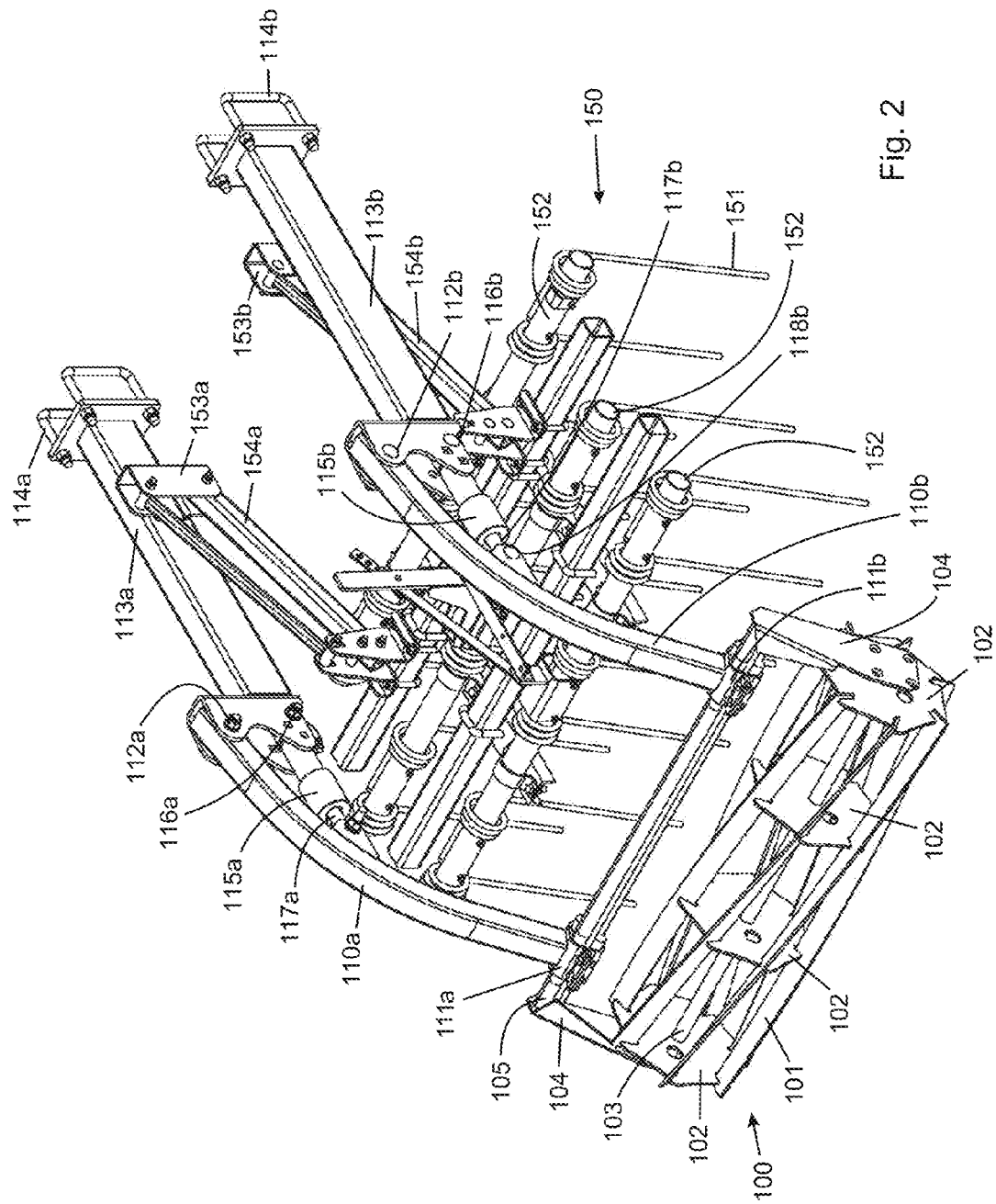
FIG. 2 is a perspective view of one of the harrow assemblies from FIG. 1.
Figure 3:
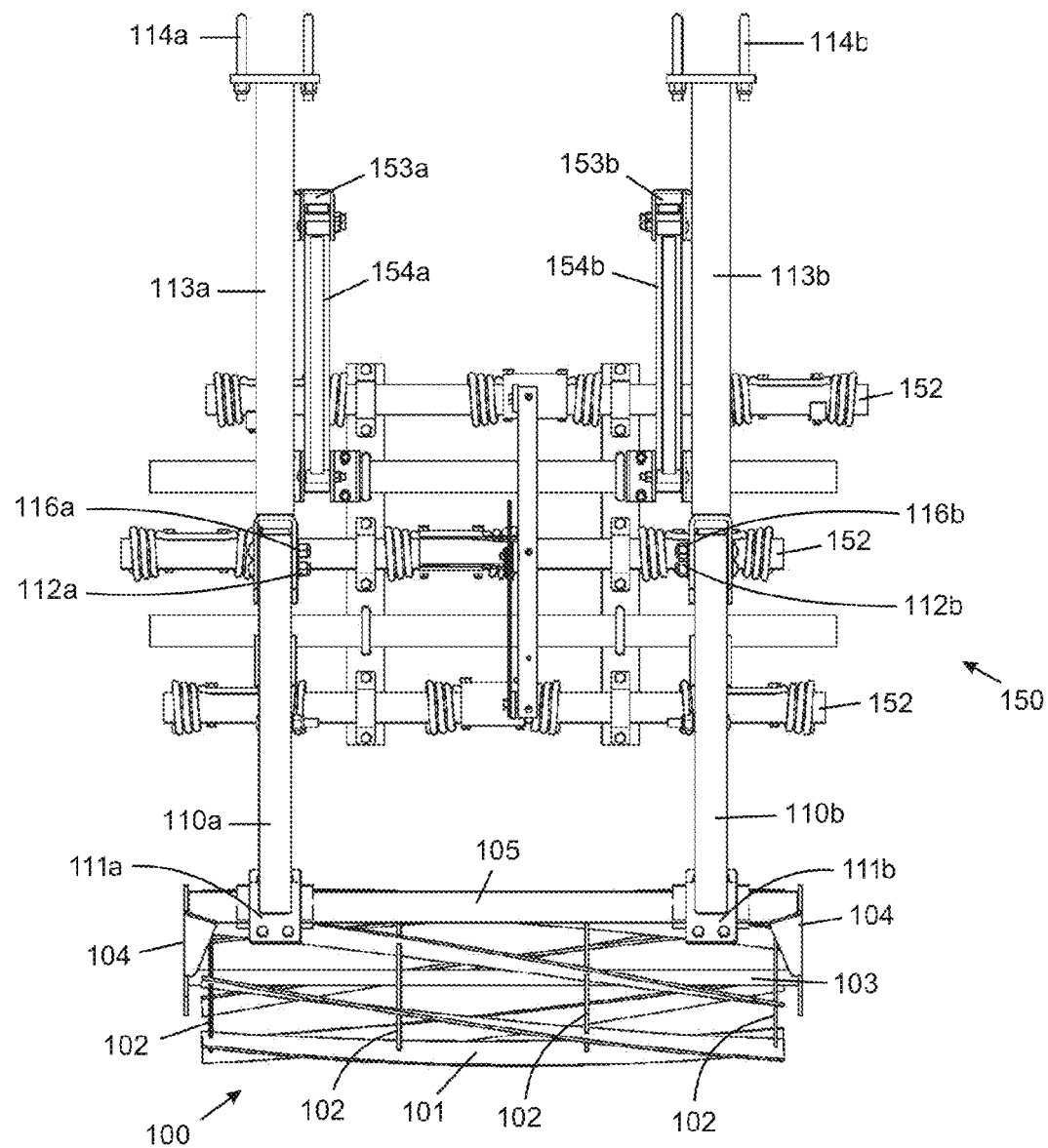
FIG. 3 is a top view of FIG. 2.
Figure 4:
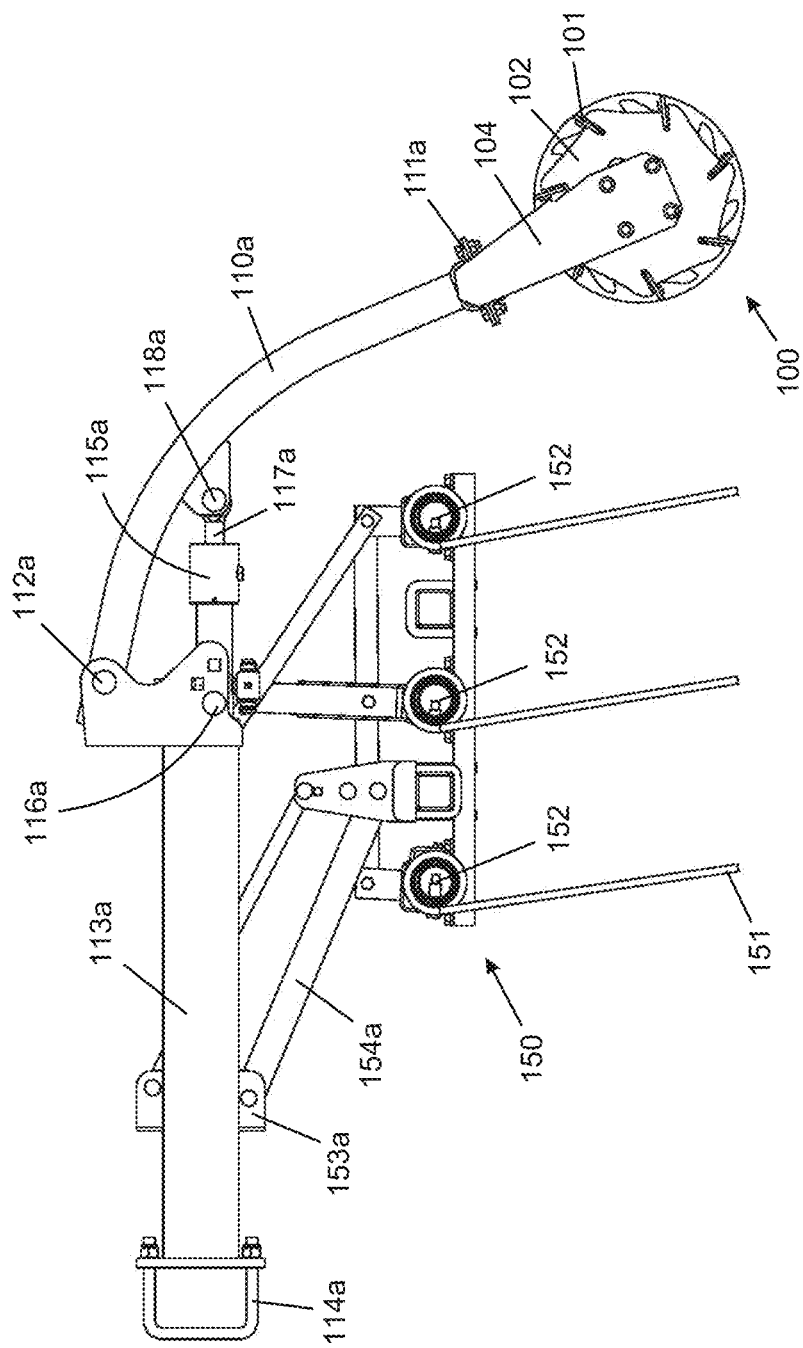
FIG. 4 is a side view of FIG. 2.

FIGS. 2-4 depict closer views of the left-most harrow assembly depicted in FIG. 1. In this embodiment there are two mounting arms for mounting one rotary harrow on the cultivator frame at the rear of the tillage apparatus. The harrow assembly comprises rotary harrow 100 and spike harrow 150. Rotary harrow 100 comprises seven generally transversely oriented harrow blades 101 (only one labeled) mounted on four transversely spaced apart rotating wheels 102 that rotate on transversely oriented axle 103 when the harrow blades are in contact with the ground while the tillage implements is being dragged across the a field. The axle is rotatably mounted in a harrow basket comprising two axle support plates 104, between which the axle is rotatably supported, and basket arm 105 attached rigidly to and extending transversely between the axle support plates. The rotary harrow is mounted on the ends of left and right mounting arms 110a, 110b with basket arm 105 extending through basket mounting brackets 111a,111b. The left and right mounting arms are approximately equidistant from a longitudinal centerline running through the rotary harrow from the front to the rear of the tillage apparatus. This is to equally balance the weight of the harrow between the two mounting arms. As is seen more clearly in FIGS. 6 and 7, there are four nitrile rubber inserts between the basket arm and each basket mounting bracket.

Mounting arms 110a,110b are pivotally mounted on arm pivots 112a,112b to permit upward and downward deflection of the rotary harrow when the rotary harrow strikes a hard object in the field. The arm pivots are rigidly attached to left and right harrow supporting arms 113a,113b, which are rigidly mounted to the rear transverse frame-member of the cultivator frame by support arm mounting brackets 114a, 114b. Spike harrow 150 comprising a plurality of spikes 151 (only one labeled) mounted on three longitudinally separated transverse crossbars 152 is also pivotally mounted to harrow supporting arms 113a,113b at spike harrow pivots 153a,153b through spike harrow support arms 154a,154b to permit free upward and downward deflection of the spike harrow. Left and right double acting hydraulic cylinders 115a,115b are mounted pivotally on left and right harrow supporting arms 113a,113b at pivot points 116a,116b with piston rods 117a, 117b pivotally attached to mounting arms 110a,110b at pivot points 118a,118b. When the piston rods are fully retracted, the rotary harrow is in contact with the ground. When the rotary harrow is deflected upwards, the piston rods extend in response. In normal operation, the hydraulic cylinders are operated with a fixed pressure to retract the piston arms to keep the rotary harrow in contact with the ground.

FIGS. 5A and 5B depict closer views of left hydraulic cylinder 115a and how it is mounted in relation to left mounting arm 110a and left harrow supporting arm 113a, as discussed above. The right hydraulic cylinder is mounted similarly on the right mounting arm and right harrow supporting arm. The hydraulic cylinders also comprise hydraulic fluid couplings, for example hydraulic fluid coupling 119a in FIG. 5, in fluid communication with a hydraulic circuit and the hydraulic cylinder for providing hydraulic fluid to and receiving hydraulic fluid from the hydraulic cylinder. Hydraulic pressure can be used to retract or extend the piston rods as desired.

FIGS. 6A and 6B depict closer views of rotary harrow 100 and how it is mounted to left mounting arm 110a, as described above. As seen more clearly in FIG. 6B, four nitrile rubber inserts 120a are placed between basket arm 105 and left basket mounting bracket 111a. There is a similar arrangement on the right side of the rotary harrow.

As depicted in FIGS. 7A-7C in relation the rotary harrow of FIGS. 2-6, when rotary harrow 100 is on level ground 130 while the tillage implement in moving forward in direction A, nitrile rubber inserts 120b between basket arm 105 and right basket mounting bracket 111b are not deformed (see FIG. 7A for greatest clarity). When the right side of rotary harrow 100 strikes rock 135, the rotary harrow deflects upward in direction B. This exerts a force in direction C on right basket mounting bracket 111b and right mounting arm 110b through basket arm 105. The force causes nitrile rubber inserts 120b to deform as depicted in FIG. 7B, thereby providing some play in the connection between the basket arm and basket mounting bracket, which relieves some of the stresses caused by the force. Thus, the deformation of the rubber inserts protects the rotary harrow and/or the rest of the apparatus (e.g. the brackets, arms and/or frame) from damage.

To provide a more complete view of the motions at work when the rotary harrow strikes the rock as shown in FIGS. 7A and 7B, FIG. 7C depicts a rear end view of rotary harrow 100 before and during the striking of rock 135. Images of mounting arms 110a,110b, mounting brackets 111a,111b, four nitrile rubber inserts 120a,120b (only one each labeled for clarity) and basket arm 105 before and during the striking of the rock are superimposed on each other to show the relative positions of these elements before and during the striking of the rock. For clarity, only one of the superimposed images is labeled. Thus, when the right side of the rotary harrow strikes rock 135, the right side of the rotary harrow deflects upward in direction B for a distance H. This causes right side mounting arm 110b to deflect upward in direction D. Because the right and left sides of the rotary harrow are connected, upward deflection of the right side would tend to cause the left side to deflect upward as well, except that both gravity and the left hydraulic cylinder exert downward forces on the left side of rotary harrow 100 and on left mounting arm 110a in directions G and F, respectively. Because the left side is being held down by the left hydraulic cylinder and gravity, the right side, which is being forced upward by the rock, also experiences a sideways (transverse) force that pushes right mounting arm 110b in direction E. The upward and sideways forces on right mounting arm 110b cause it to move up and toward the right in relation to left mounting arm 110a so that normal distance I between the left and right mounting arms increases to distance J. Left mounting arm 110a stays in relatively the same position before, during and after the right side of the rotary harrow striking the rock.

All of this movement on the right side of the rotary harrow in response to striking the rock has the potential to cause damage, especially if the rotary harrow was completely rigidly attached to the mounting arms. However, in the present invention, deformation of nitrile rubber inserts 120a,120b can compensate for the relative motion between the right and left sides of the rotary harrow. This can be seen by comparing the shapes of nitrile rubber inserts 120b in FIG. 7C before (see area Y) and after (see area Z) the rotary harrow strikes the rock. Before striking the rock as seen in area Y, the four nitrile rubber inserts 120b have a regular shape all around basket arm 105 within right mounting bracket 111b. Upon deflection (area Z) pivoting of basket arm 105 around a longitudinal axis causes the gap between the mounting bracket and the basket arm at the upper right and lower left portions of the mounting bracket to decrease thereby squeezing the rubber inserts so that the rubber becomes thinner at these portions of the mounting bracket. Conversely, the gap between the mounting bracket and the basket arm at the lower right and upper left portions of the mounting bracket increase so that the rubber inserts at these locations can thicken in response to the thinning at the other portions. Further, the sideways motion of the right mounting arm causes shear forces on the rubber inserts such that the tops of the inserts also deform toward the right in relation to the bottoms of the inserts. In profile, the nitrile rubber inserts change from a rectangular shape (see area Y) to an irregular rhombus shape (see area Z) in response to the forces caused by striking the rock. Nitrile rubber inserts 120a on the left side undergo the same kinds of deformation. Thus, it can be seen from FIG. 7 that the compressible rubber inserts are advantageously capable of compensating for the various forces at play when the rotary harrow strikes a rock, thereby relieving stresses that these forces would otherwise inflict on the mounting brackets, mounting arms, frame and/or basket arm.

Figure 8A:
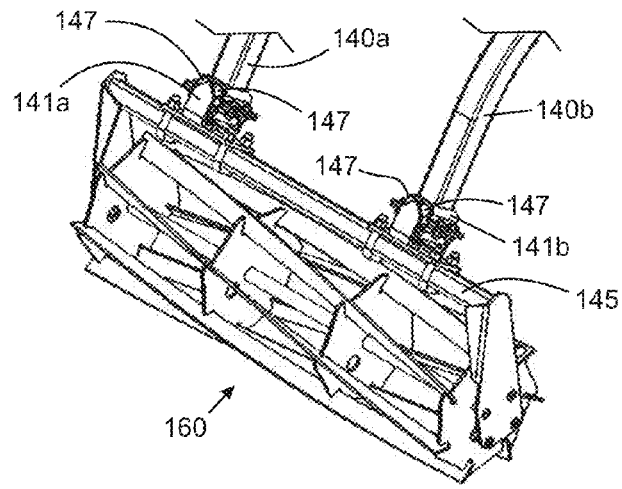
FIG. 8A is a perspective view of a rotary harrow mounted to a mounting arm showing an alternate arrangement of a mounting bracket and rubber material.
Figure 8B:
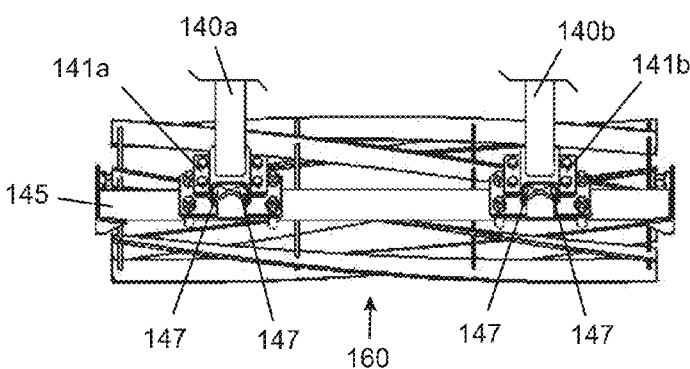
FIG. 8B is a top view of FIG. 8A.
Figure 8C:
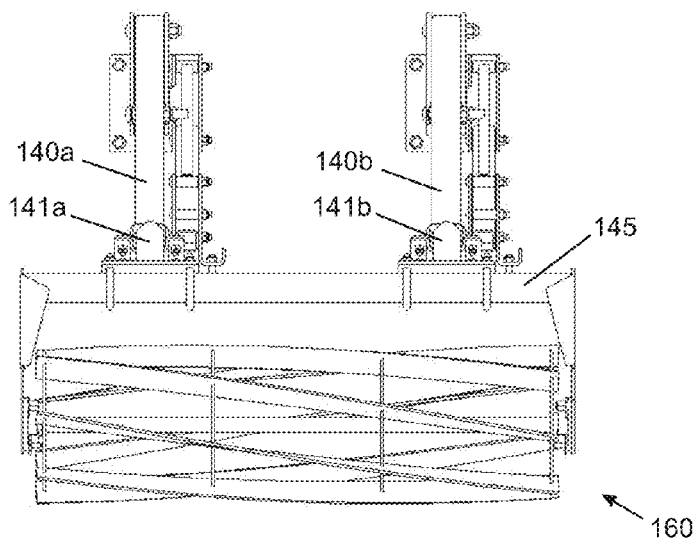
FIG. 8C is a rear end view of FIG. 8A.

FIGS. 8A-8C depict rotary harrow 160 whose basket arm 145 is mounted to mounting arms 140a,140b through an alternate arrangement of mounting brackets 141a,141b and rubber material 147. In this arrangement, rubber material 147 is between mounting brackets 141a,141b and mounting arms 140a,140b, rather than between the mounting brackets and basket arm as depicted in FIG. 7. In FIG. 8, the rubber material runs parallel to the mounting arms and perpendicular to the basket arm rather than perpendicular to the mounting arms and parallel to the basket arm as depicted in FIG. 7.

FIGS. 9A-9C depict an embodiment of a harrow assembly in which rotary harrow 200 and spike harrow 250 are mounted to a cultivator frame with only one mounting arm 210 and one harrow supporting arm 213. In this embodiment, the mounting arm and supporting arm are located as close as possible to a longitudinal centerline running through the rotary harrow and spike harrow from the front to the rear of the tillage apparatus in order to balance the weight of each harrow as closely as possible on either side of the arms. In this embodiment, additional support bar 221 is welded to basket mounting brackets 211a,211b and support bar bracket 222 is used to mount the additional support bar to mounting arm 210. Otherwise, the structures are similar to those described in FIGS. 2-7.

Figure 10:
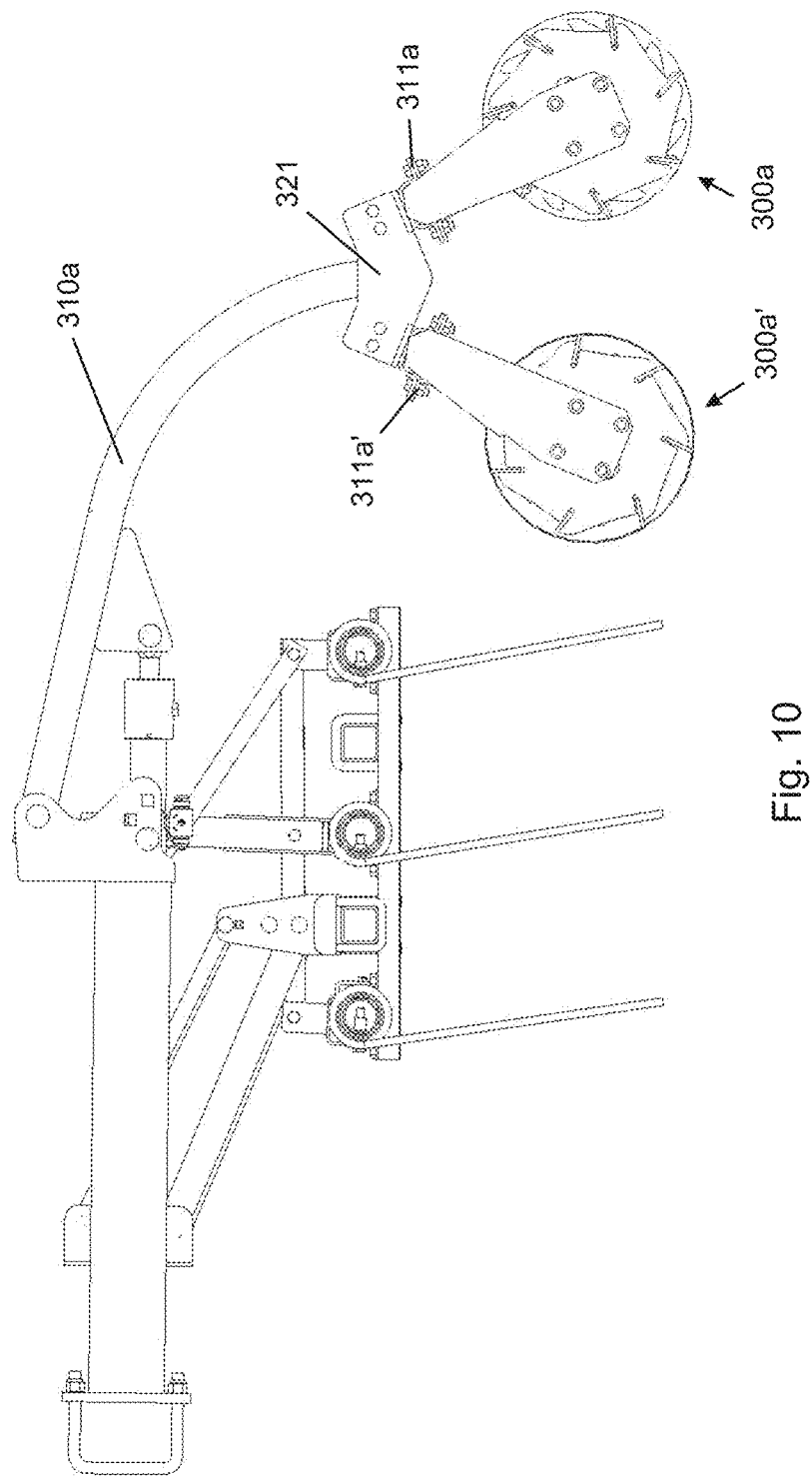
FIG. 10 is a side view of a double roller embodiment in which two rotary harrows are mounted longitudinally in relation to each other to common pivoting mounting arms.

The tillage apparatus can comprise more than one rotary harrow. As shown in FIG. 10, two longitudinally spaced apart rotary harrows 300a,300a' can be mounted on the same two transversely spaced apart mounting arms (only mounting arm 310a is depicted) using additional support assembly 321 to which the basket arms of both rotary harrows can be mounted using two basket mounting brackets per basket arm. Only one the left mounting brackets 310a,310a' on each basket arm of each rotary harrow are depicted.

Figure 11:
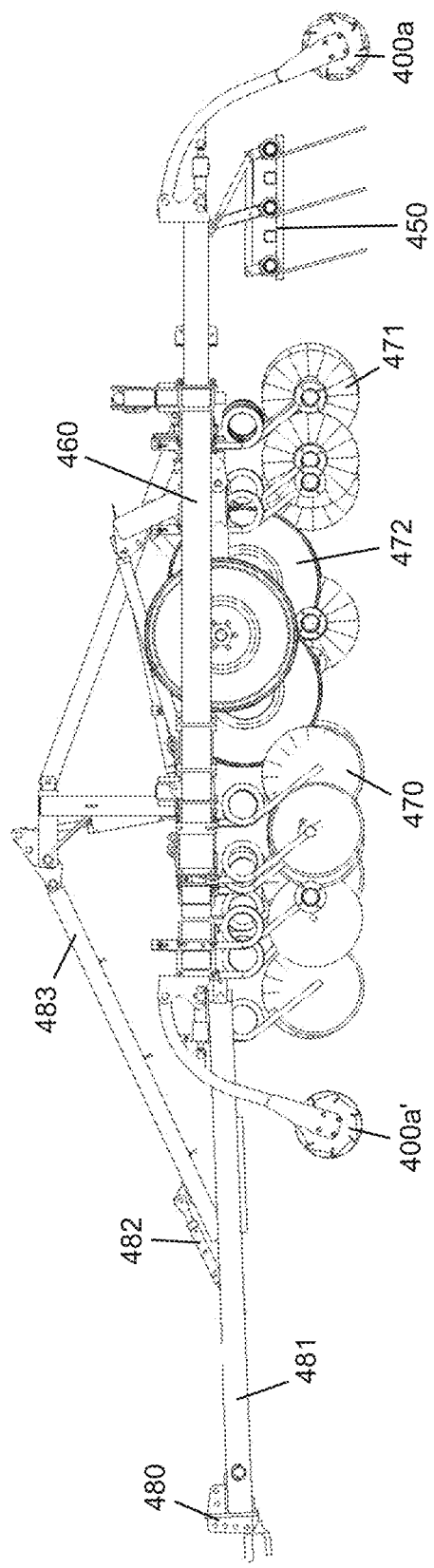
FIG. 11 is a side view of another embodiment of a tillage apparatus of the present invention having two rotary harrows mounted thereon, one harrow at a rear of the apparatus and the other at a front of the apparatus.

FIG. 11 shows another embodiment of a tillage apparatus having two rotary harrows 400a,400a', in which one rotary harrow 400a is mounted at a rear of the apparatus on a rearmost transverse frame-member and the other rotary harrow 400a' is mounted at the front of the apparatus on a front-most transverse frame member. Mounting of the rotary harrows is as described in relation to FIGS. 2-7, except that there is no spike harrow associate with front-most rotary harrow 400a', while spike harrow 450 is associated with rear-most harrow 400a.

Other features of the tillage apparatus can also be seen in FIG. 11, including cultivator frame 460, hitch 480 and tow bar 481. Gangs of different sized coulter wheels 470,471,472 can be lowered into engagement with a field or raised away from the field by the action of hydraulic cylinders and pivoting arms, for example 482 and 483, respectively.

Figure 12A:
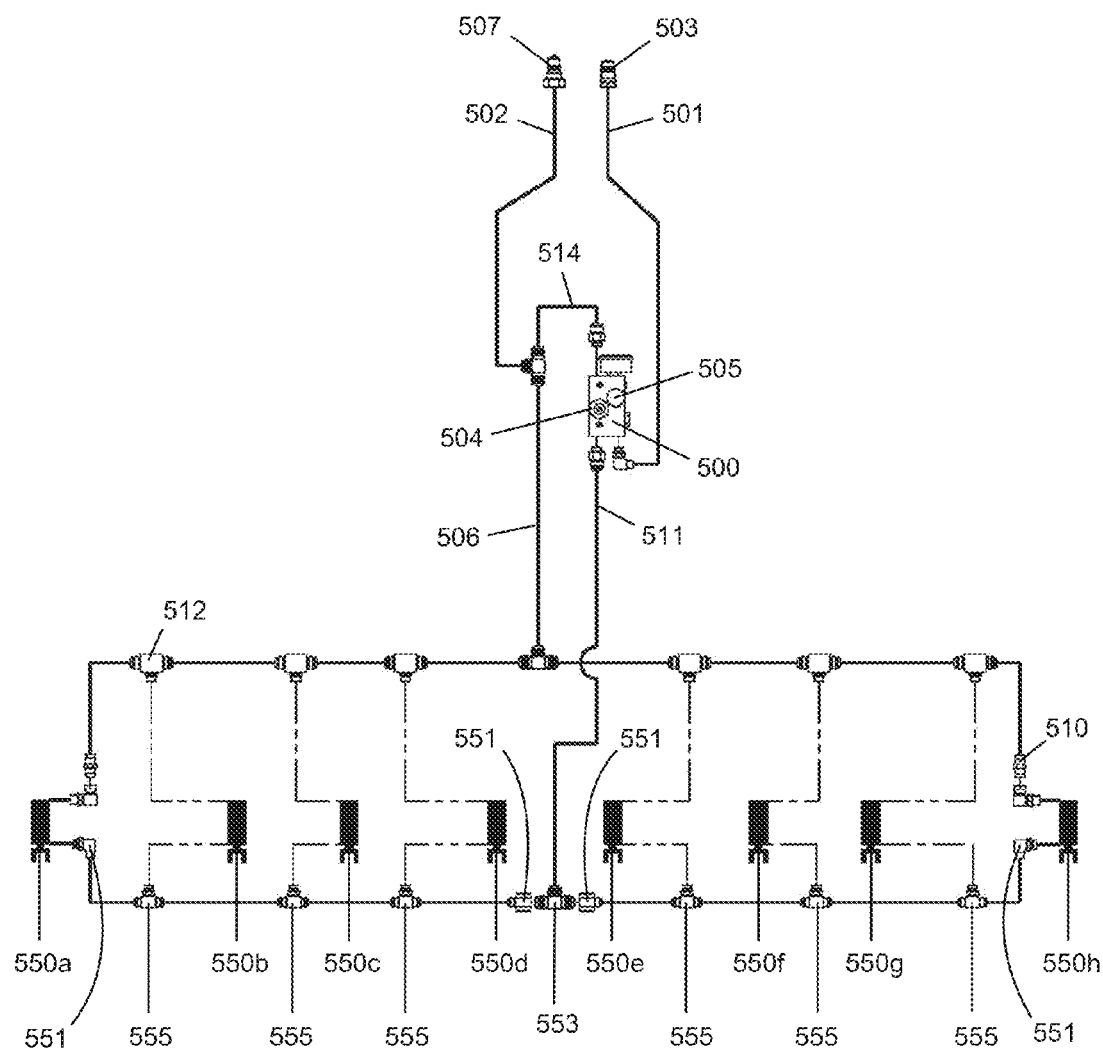
FIG. 12A is a schematic diagram of a first embodiment of a hydraulic circuit for use in controlling a rotary harrow in the present invention.

FIG. 12A is a schematic diagram of a first embodiment of a hydraulic circuit for use in controlling a gang of four transversely spaced apart rotary harrows. The circuit comprises a plurality of hydraulic lines containing hydraulic fluid for transmitting hydraulic pressure to eight double acting hydraulic cylinders 550a-h. Cylinders 550a,550b control two mounting arms for a first rotary harrow, cylinders 550c,550d control two mounting arms for a second rotary harrow, cylinders 550e,550f control two mounting arms for a third rotary harrow and cylinders 550g,550h control two mounting arms for a fourth rotary harrow. The cylinders are shown retracted, meaning that the harrow is engaged with the ground. Various couplings, including two-way couplings (e.g. 510) and three-way couplings (e.g. 512) join lines to provide fluid pressure to various parts of the circuit. One or more of the couplings may contain shut-off valves if desired.

Under normal operation in which the hydraulic cylinders are retracted under a fixed pressure to maintain engagement of the rotary harrows with the ground, hydraulic fluid pressure is transmitted to the circuit from a hydraulic supply and a hydraulic pump on a tractor through a feed line coupled with coupling 503 to hydraulic line 501. Fluid pressure is transmitted to pressure reduce valve 505 in double function valve 500 where the pressure reduce valve is set to provide the fixed fluid pressure to the hydraulic cylinders through line 511 in fluid communication with the pressure reduce valve. Fluid pressure is thus transmitted from the pressure reduce valve to the hydraulic cylinders through line 511, three-way coupling 553 and a plurality of lines, two-way couplings 551 and three-way couplings 555 to hydraulic cylinders 550a-h. The fixed fluid pressure is set at a value sufficient to provide a force of about 150 pounds on each mounting arm through the cylinders. The actual pressure will depend on system parameters, for example the internal diameter of the hydraulic lines. Provided one or more of the rotary harrows does not strike a hard object, the cylinders will remain retracted and the rotary harrows will remain in constant engagement with the ground under a fixed force.

Double function valve 500 also comprises pressure relief valve 504 that is also in fluid communication with line 511 and that is set to open at a set pressure that exceeds the fixed fluid pressure by an amount corresponding to an equivalent of 20 pounds of extra force applied by one cylinder. When a rotary harrow strikes a rock with sufficient force to create a backpressure in one or more of the hydraulic cylinders equal to or greater than the set pressure of the relief valve, relief valve 504 will open and hydraulic fluid will rush into line 514 to relieve the pressure in the cylinders. The cylinders will extend in response to the harrow striking the rock and the relief in pressure in the cylinders thereby permitting the rotary harrow to deflect upward as the mounting arms are no longer forcing the rotary harrow down. When the pressure in the cylinder again drops to or below the fixed fluid pressure once the rock has been passed, pressure relief valve 504 will close and pressure to the cylinders will rise to and once again be maintained at the fixed fluid pressure. Excess fluid that rushed into line 514 can ultimately flow to the other side of the cylinders through line 506 and a plurality of other lines and three-way valves after line 506, or back to the hydraulic supply through line 502 that is coupled to a return line with coupling 507.

It is also apparent from the hydraulic circuit that applying pressure through line 502 rather than line 501 will supply fluid pressure to the other side of the hydraulic cylinders thereby extending the cylinders and raising the rotary harrows. This is useful when an operator does not wish to have the harrows engaged with the ground, for example, while transporting the implement to the field.

Figure 12B:
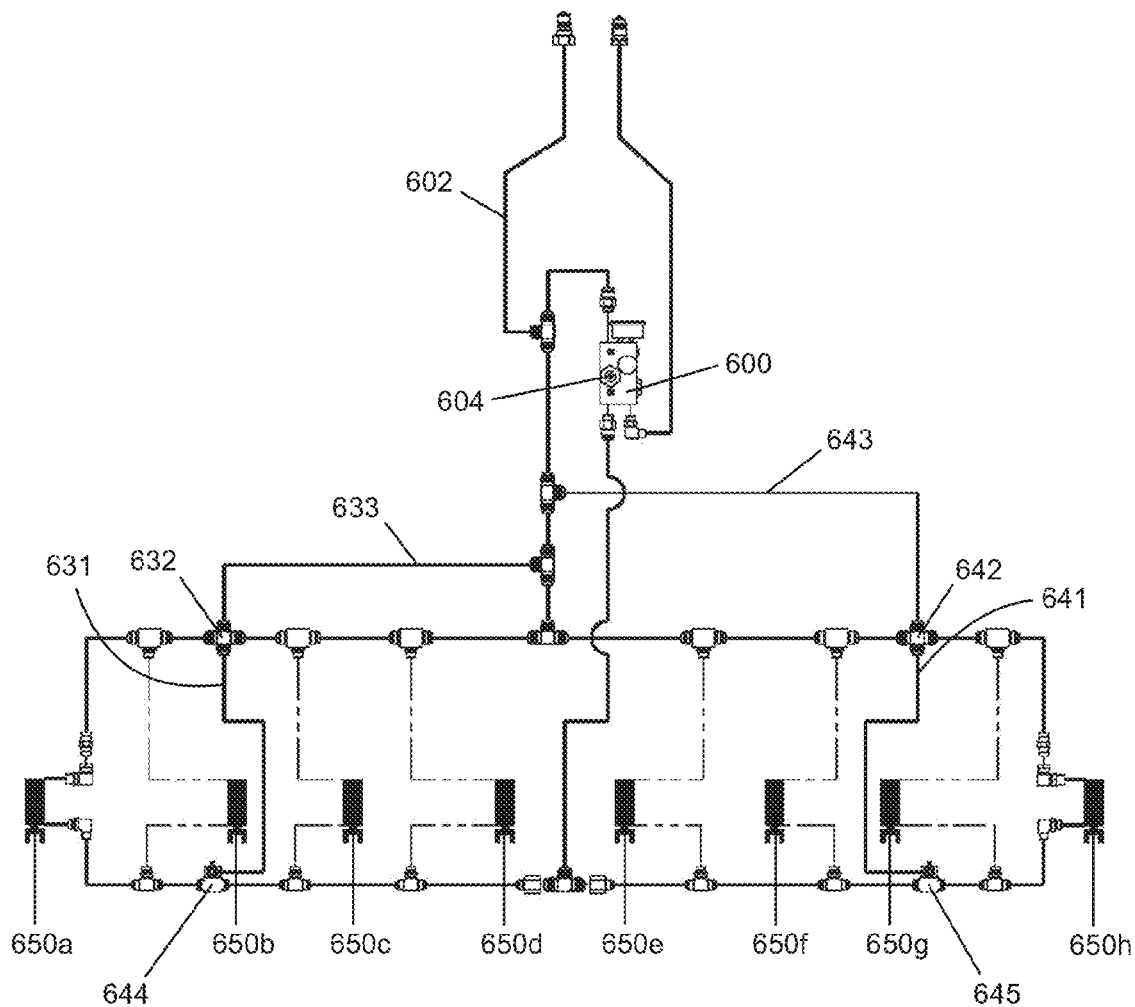
FIG. 12B is a schematic diagram of a second embodiment of a hydraulic circuit for use in controlling a rotary harrow in the present invention, the hydraulic circuit comprising extra relief valves.

FIG. 12B is a schematic diagram of a second embodiment of a hydraulic circuit that is similar to the circuit of FIG. 12A except that two additional relief valves 644,645 are placed in the circuit on opposite sides. Left side relief valve 644 is proximal hydraulic cylinders 650a-d and right side relief valve 645 is proximal hydraulic cylinders 650e-h. The left and right side relief valves are set to open at a set pressure that is the same as the set pressure of relief valve 604 in double function valve 600 (although the set pressure of one or more of the relief valves could be different that the others if desired). When a rotary harrow on the left side strikes a rock and pressure in one or more of cylinders 650a-d increases beyond the set pressure of relief valve 644, the valve will open to relieve the pressure as described above and excess fluid will flow into line 631 and through four-way coupling 632, and can ultimately flow to the other side of cylinders 650a-d or through line 633 and eventually back to the hydraulic supply through line 602 that is coupled to a return line. Likewise, when a rotary harrow on the right side strikes a rock and pressure in one or more of cylinders 650e-h increases beyond the set pressure of relief valve 645, the valve will open to relieve the pressure as described above and excess fluid will flow into line 641 and through four-way coupling 642, and can ultimately flow to the other side of cylinders 650e-h or through line 643 and eventually back to the hydraulic supply through line 602 that is coupled to a return line. Additional relief valves 644,645 permit faster and localized response to striking a rock so that relief valve 604 may not need to open. In this way, when a rotary harrow on one side strikes a rock, the rotary harrows on the other side can remain engaged with the ground. Otherwise, the hydraulic circuit of FIG. 12B functions in the same way as that of FIG. 12A.

Figure 12C:
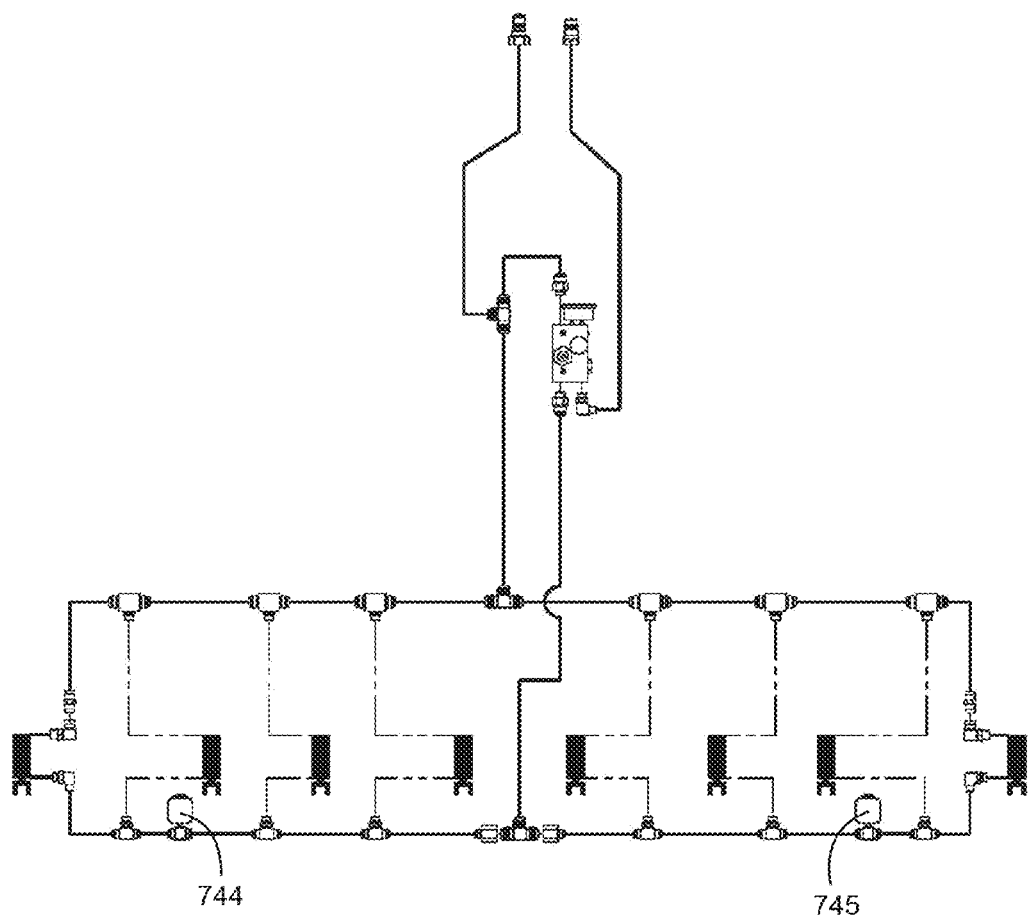
FIG. 12C is a schematic diagram of a third embodiment of a hydraulic circuit for use in controlling a rotary harrow in the present invention, the hydraulic circuit comprising hydraulic accumulators.

FIG. 12C is a schematic diagram of a third embodiment of a hydraulic circuit that is similar to the circuit of FIG. 12A except that two hydraulic accumulators 744,745 are placed in the circuit on opposite sides. The accumulators occupy the same positions in the circuit as the two additional relief valves do in FIG. 12B. Hydraulic accumulators are simply hydraulic empty loops of hydraulic line into which excess hydraulic fluid can be pushed when the pressure in the cylinders increases due to the harrow striking a rock. They serve a similar function as the additional relief valves in FIG. 12B, but the advantage of accumulators over additional relief valve lies in the elimination of the extra lines and couplings associated with the additional relief valves. However, hydraulic accumulators have a limit to the amount of pressure that can be relieved.

Figure 12D:
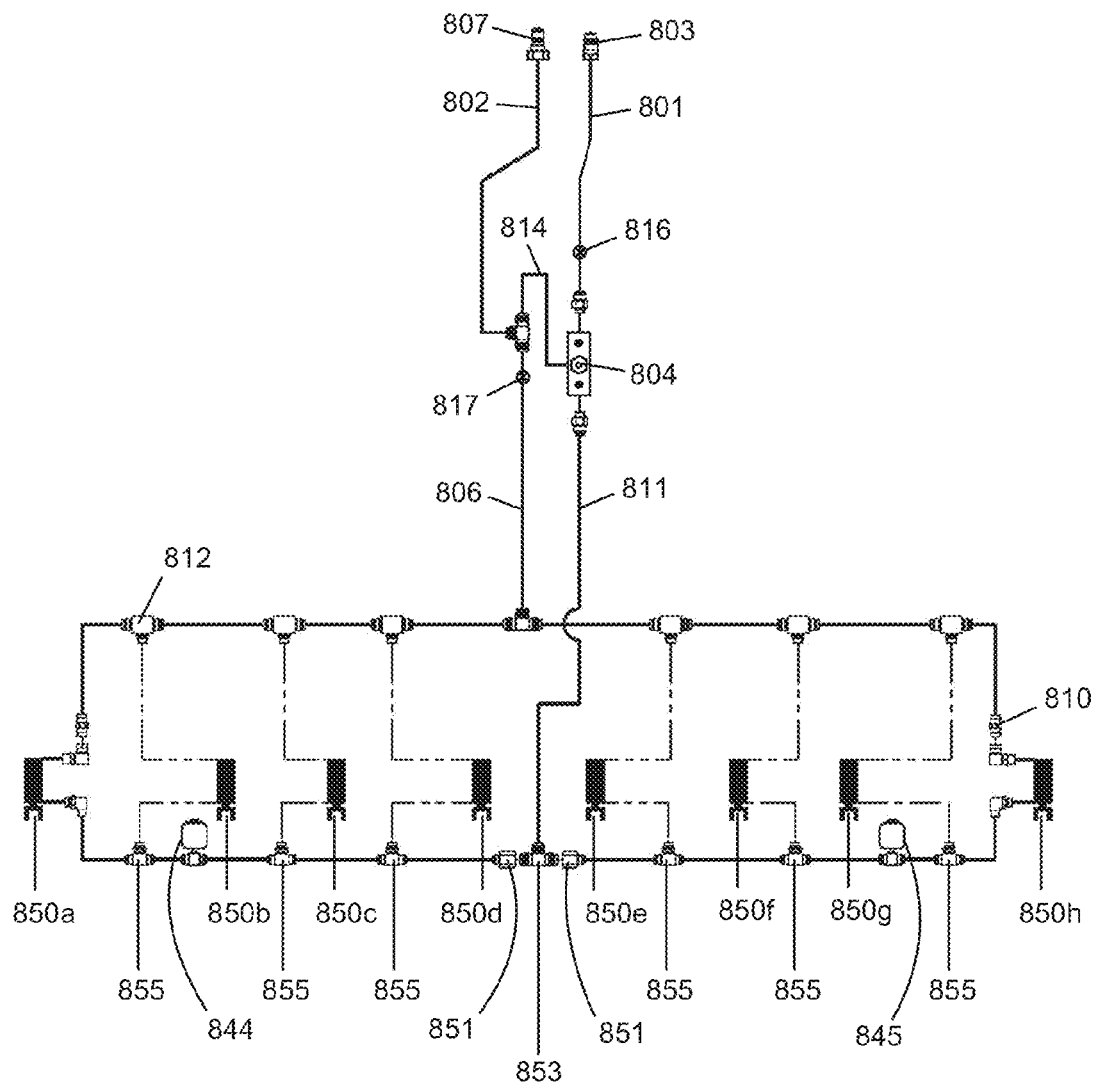
FIG. 12D is a schematic diagram of a fourth embodiment of a hydraulic circuit for use in controlling a rotary harrow in the present invention, the hydraulic circuit comprising hydraulic accumulators and a single function relief valve.

FIG. 12D is a schematic diagram of a fourth embodiment of a hydraulic circuit for use in controlling a gang of four transversely spaced apart rotary harrows. The circuit comprises a plurality of hydraulic lines containing hydraulic fluid for transmitting hydraulic pressure to eight double acting hydraulic cylinders 850a-h. Cylinders 850a,850b control two mounting arms for a first rotary harrow, cylinders 850c,850d control two mounting arms for a second rotary harrow, cylinders 850e,850f control two mounting arms for a third rotary harrow and cylinders 850g,850h control two mounting arms for a fourth rotary harrow. The cylinders are shown retracted, meaning that the harrow is engaged with the ground. Various couplings, including two-way couplings (e.g. 810) and three-way couplings (e.g. 812) join lines to provide fluid pressure to various parts of the circuit. One or more of the couplings may contain shut-off valves if desired.

Under normal operation in which the hydraulic cylinders are retracted under a fixed pressure to maintain engagement of the rotary harrows with the ground, hydraulic fluid pressure is transmitted to the circuit from a hydraulic supply and a hydraulic pump on a tractor through a feed line coupled with coupling 803 to hydraulic line 801. Fluid pressure is transmitted through ball valve 816 and relief valve 804 to the hydraulic cylinders through line 811 in fluid communication with the relief valve. Fluid pressure is thus transmitted from the relief valve to the hydraulic cylinders through line 811, three-way coupling 853 and a plurality of lines, two-way couplings 851 and three-way couplings 855 to hydraulic cylinders 850a-h. The fluid pressure is set at a value sufficient to provide a force of about 150 pounds on each mounting arm through the cylinders. The actual pressure will depend on system parameters, for example the internal diameter of the hydraulic lines. Provided one or more of the rotary harrows does not strike a hard object, the cylinders will remain retracted and the rotary harrows will remain in constant engagement with the ground under a fixed force.

During operation, ball valve 816 in fluid communication with line 801 is closed to prevent fluid from returning through the inlet line. Additionally, ball valve 817 in fluid communication with line 806 is closed to prevent fluid from by-passing relief valve 804 when the harrow strikes a hard impediment. Thus, in operation the hydraulic circuit is closed. Fluid pressure in the hydraulic circuit and downward forces acting on the mounting arms and harrow increase when the harrow strikes a hard impediment. To reduce the pressure in the hydraulic circuit and therefore the downward force on the mounting arms and harrow, fluid under the excess pressure flows into hydraulic accumulators 844,845, which buffer the pressure in the circuit and reduce the forces on the mounting arms and harrow. Due to back pressure from air in the hydraulic accumulators, the pressure and therefore the downward forces are not maintained at a constant level throughout the deflection of the harrow, the pressure and forces allowed to increase until a plateau is reached. If the plateau exceeds the set pressure on relief valve 804, the relief valve will trip and excess fluid will flow through line 814 and back to the hydraulic supply through line 802 that is coupled to a return line with coupling 807.

Figure 13A:
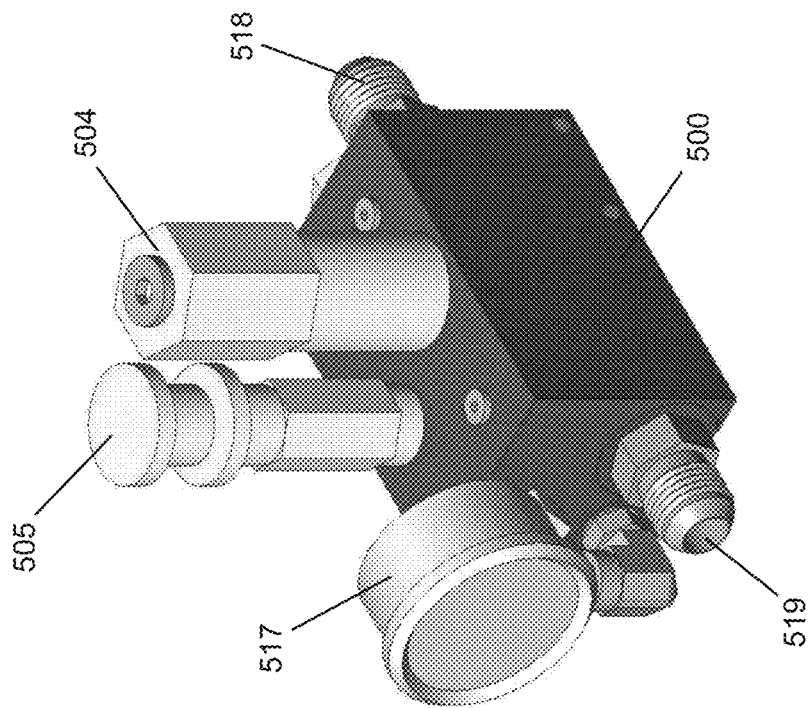
FIG. 13A is a perspective view of a double function valve useful in a hydraulic circuit for controlling the rotary harrow.
Figure 13B:
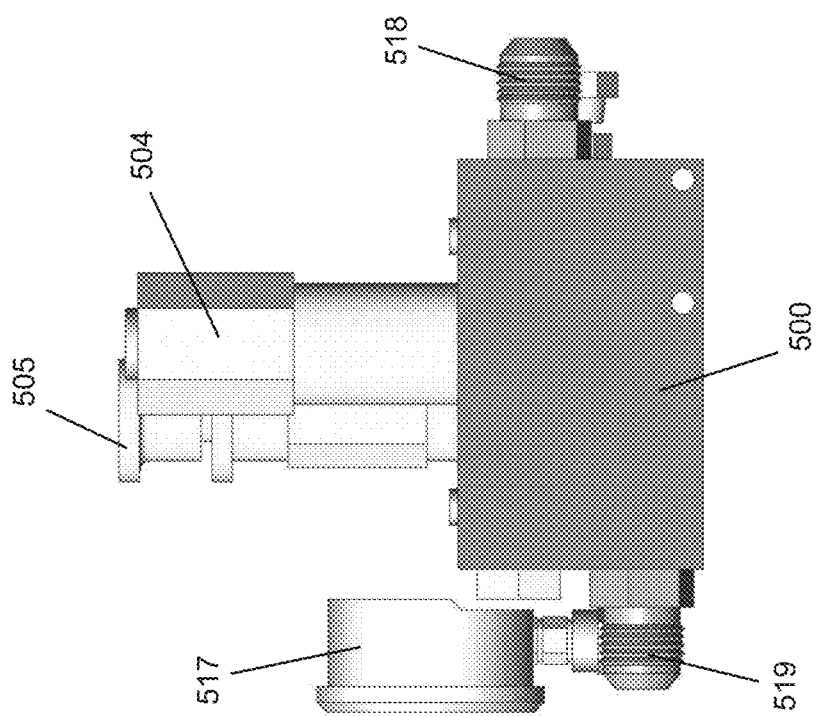
FIG. 13B is a side view of the valve depicted in FIG. 13A.

Perspective and side views of double function valve 500 from FIG. 12A are shown in FIGS. 13A and 13B. Such a valve combines pressure reduce valve 505 and relief valve 504, both of which are in fluid communication with port 518 that is coupled to line 511 in the circuit of FIG. 12A. Pressure gauge 517 measures pressure at the pressure reduce valve, while port 519 is in fluid communication with the relief valve so that when the relief valve opens fluid can flow through the relief valve into line 514 in the circuit of FIG. 12A.

Figure 14:
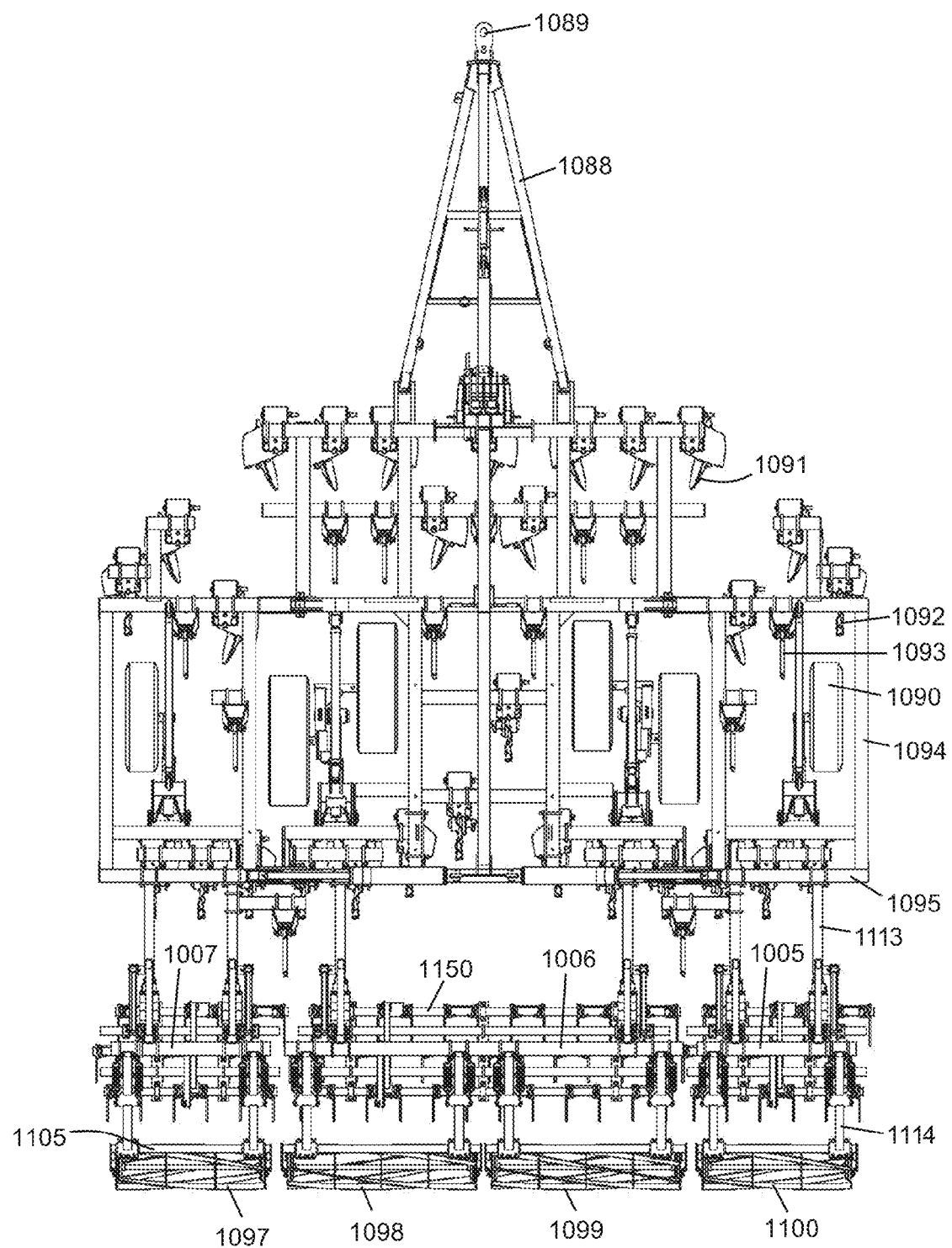
FIG. 14 is a top view of another embodiment of a tillage apparatus of the present invention having four harrow assemblies mounted to sub-frames at a rear of a cultivator frame of the tillage apparatus, the sub-frames mounted to a transverse frame-member.

FIG. 14 depicts another embodiment of a tillage apparatus having a gang of four harrow assemblies mounted to tool bars 1005,1006,1007, which are in turn mounted to transverse frame-member 1095 at a rear of cultivator frame 1094 of the tillage apparatus. The tillage apparatus further comprises a plurality of field working tools such as tillage and fertilizer application shanks 1093, coulter wheels 1092 and disc harrows 1091 (only one of each being labeled). The frame rides on eight wheels with rubber tires 1090 (only one labeled) and is towed using tow bar 1088 hitched to a tractor with hitch 1089. The tool bars 1005,1006,1007 are mounted on the transverse frame-member 1095 by six supporting arms 1113 (only one labeled). The gang of four harrow assemblies comprises rotary harrows 1100,1099,1098,1097 and a plurality of spike harrows 1150 (only one labeled). The four rotary harrows are mounted to the tool bars by two mounting arms per rotary harrow (only one labeled as 1114) mounted to a basket arm (only one labeled as 1105) on a basket of each rotary harrow. Parts and operation of the harrow assemblies are described in more detail in connection with FIG. 15A, FIG. 15B and FIG. 15C.

Figure 15A:
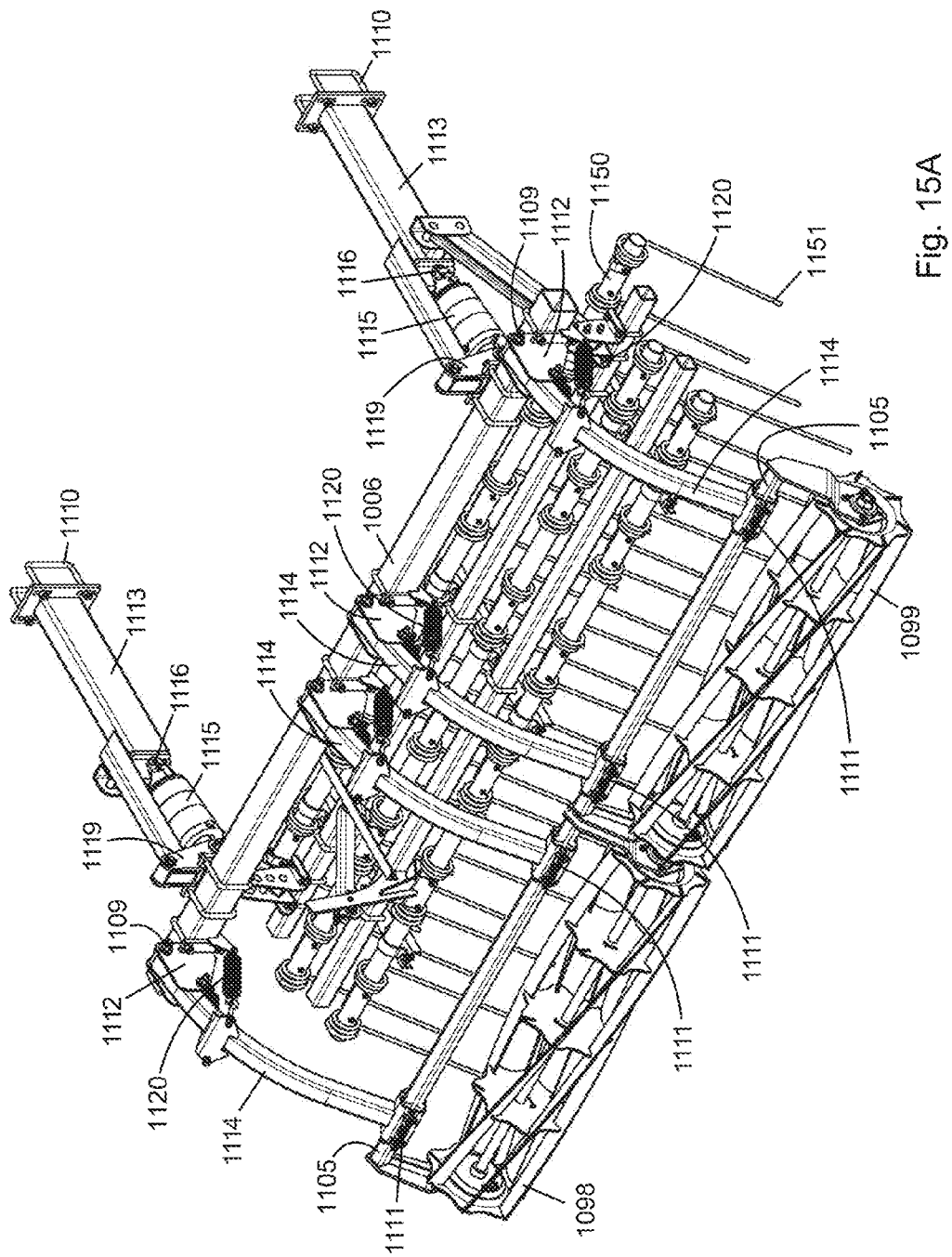
FIG. 15A is a perspective view of the two central harrow assemblies from FIG. 14.
Figure 15B:
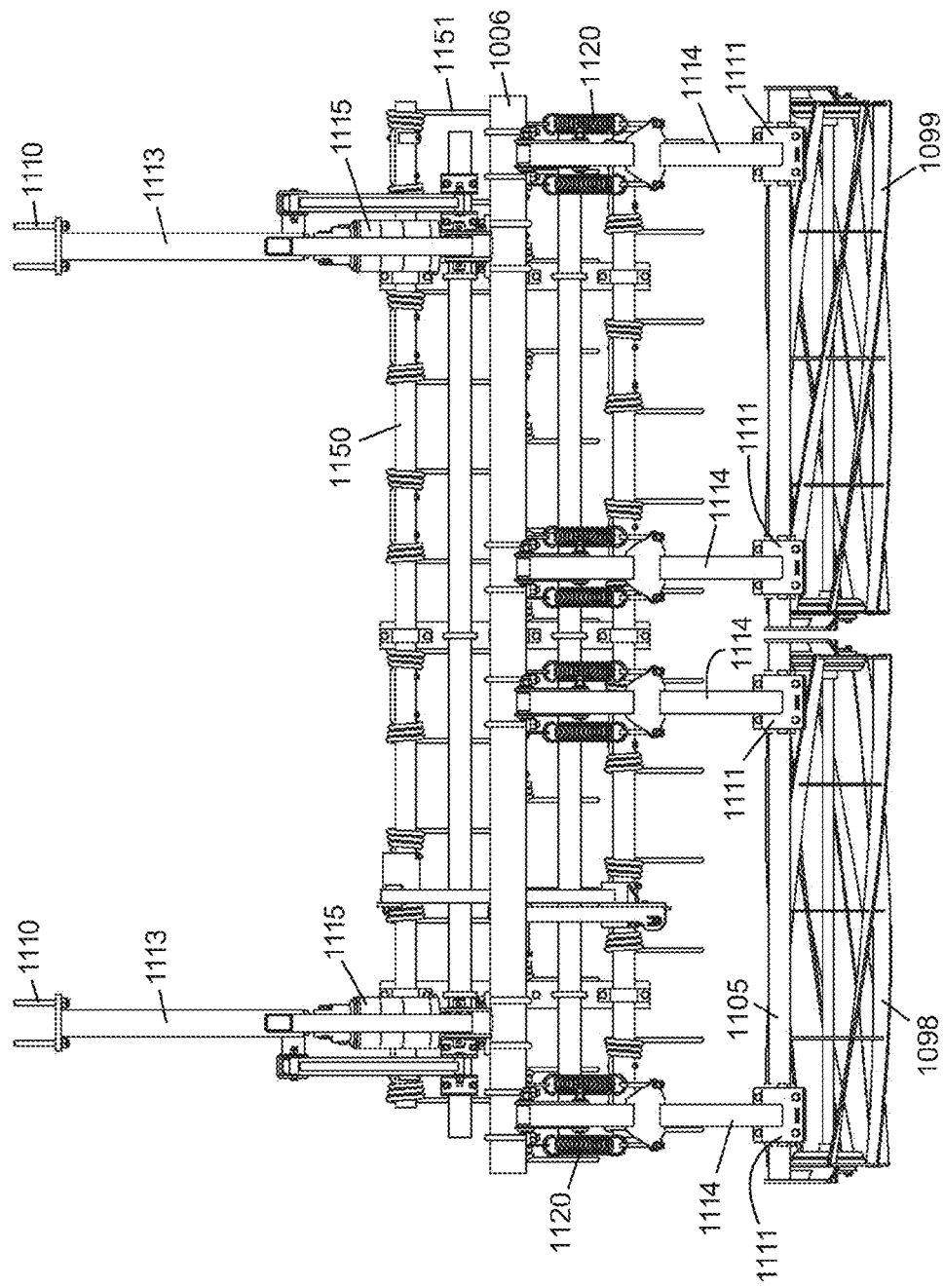
FIG. 15B is a top view of FIG. 15A.
Figure 15C:
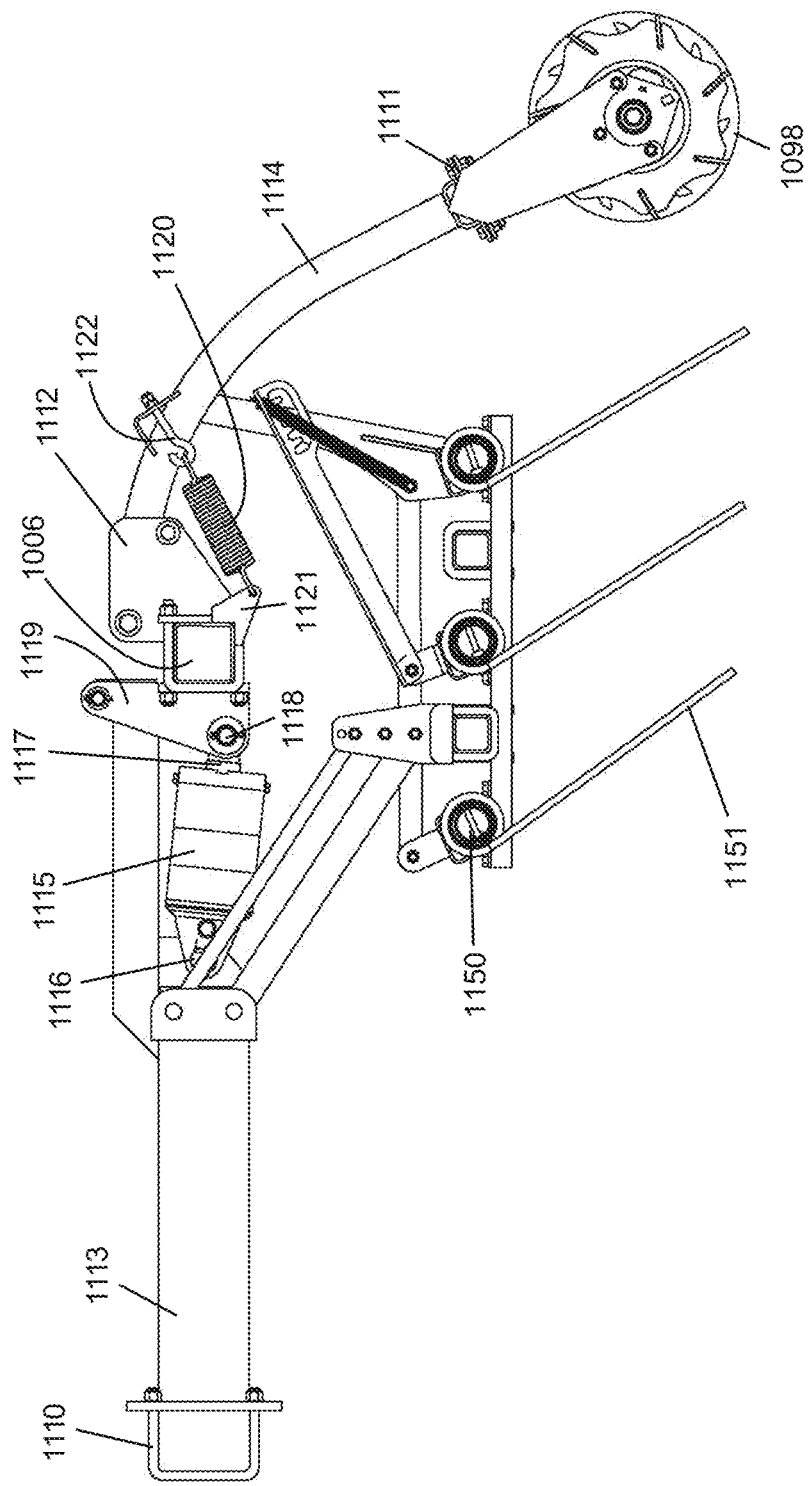
FIG. 15C is a side view of FIG. 15A.

FIG. 15A, FIG. 15B and FIG. 15C depict closer views of the center harrow assembly depicted in FIG. 14. In this embodiment there are two mounting arms 1114 per rotary harrow for mounting each rotary harrow 1098,1099 on a single tool bar 1006. The harrow assembly comprises rotary harrows 1098,1099 and spike harrows 1150 (only one labeled). Rotary harrows 1098,1099 are similar in nature to the one described in connection with FIG. 2. The rotary harrows 1098,1099 are mounted on the ends of mounting arms 1114 with basket arms 1105 extending through basket mounting brackets 1111. The mounting arms on each rotary harrow are approximately equidistant from a longitudinal centerline running through the rotary harrow from the front to the rear of the tillage apparatus. As described in connection with FIGS. 6 and 7, there are four nitrile rubber inserts between the basket arm and each basket mounting bracket.

Mounting arms 1114 are pivotally mounted on arm pivots 1112 at pivot points 1109 to permit upward and downward deflection of the rotary harrows when the rotary harrows strike hard objects in the field. The arm pivots 1112 are rigidly attached to the tool bar 1006, which is rigidly mounted to the rear transverse frame-member of the cultivator frame through two supporting arms 1113 mounted to the frame-member by support arm mounting brackets 1110. Spike harrows 1150 (only one labeled) comprising a plurality of spikes 1151 (only one labeled) are mounted to the tool bar 1006. Rephasing hydraulic cylinders 1115 are mounted pivotally on the supporting arms 1113 at pivot points 1116 with piston rods 1117 pivotally attached the tool bar 1006 through brackets 1119 at pivot points 1118. When the piston rods are fully retracted, the rotary harrow is in contact with the ground. When the rotary harrow is deflected upwards, mounting arms 1114 pivot at pivot points 1109 to stretch helical tension springs 1120, two per mounting arm for a total of eight for the two rotary harrows. Eight helical tensions springs 1120 are connected to the tool bar 1006 at eight flanges 1121 and to four mounting arms 1114 at eight hooks 1122, as best seen in FIG. 15C for one spring 1120.

In normal operation, the rephasing hydraulic cylinders 1115 are operated with a locked pressure to keep the rotary harrow in contact with the ground. Helical tensions springs 1120 act to buffer the deflection of the rotary harrow after striking a hard object and to return the rotary harrow to the ground after clearing the hard object. The rephasing cylinders are plumbed in series to permit simultaneous control of the cylinder strokes across the apparatus to permit pressure control from a remote location without stopping the apparatus. Indicators (not shown), for example pivoting indicators, may be mounted on each harrow assembly to permit remote determination of where each rotary harrow is set by the stroke of the cylinders. This permits an operator to readily determine whether a pressure adjustment is needed to suit operating conditions. In addition, the ability to remove or adjust rotary harrow down pressure remotely permits the operator to adjust down pressure for field conditions, or to lift the harrows out of the way if needed.

Figure 16A:
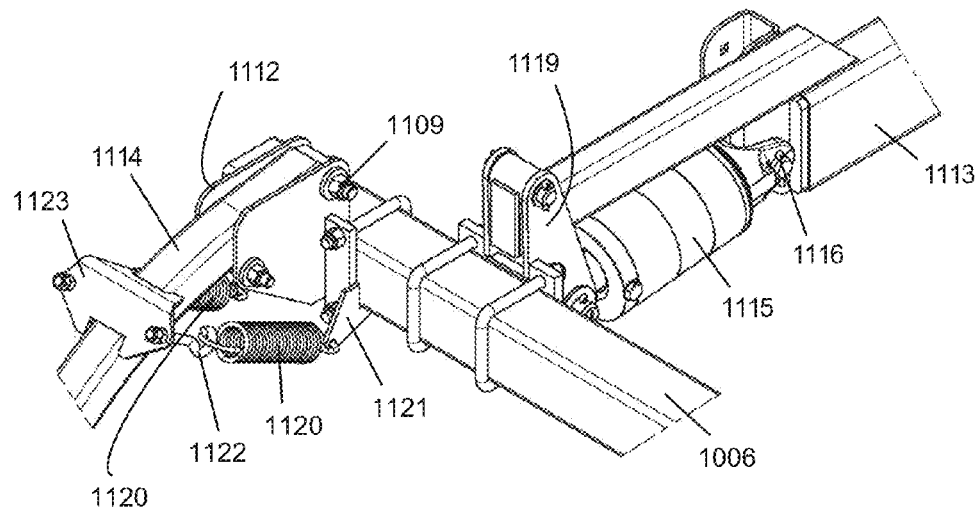
FIG. 16A is a perspective close up view of a hydraulic cylinder mounted to a supporting arm and to a tool bar, the tool bar having a mounting arm pivotally mounted thereon and helical tension springs connecting the pivoting mounting arm to the tool bar.
Figure 16B:
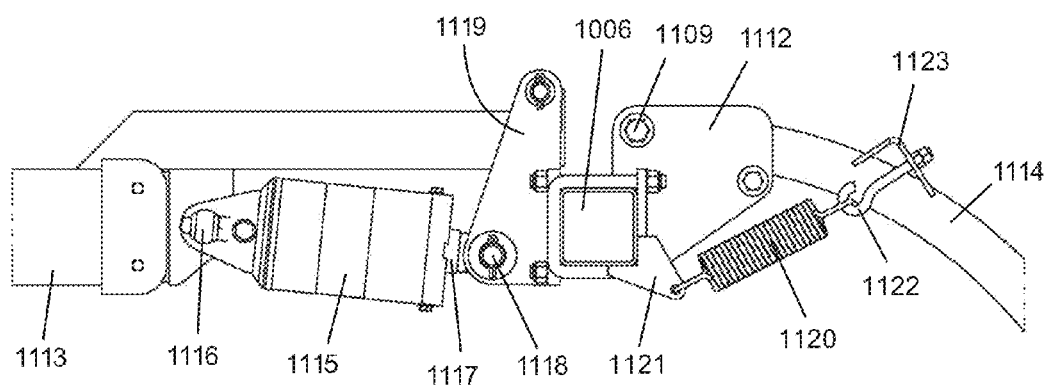
FIG. 16B is a side view of FIG. 16A.

FIGS. 16A and 16B depict closer views of rephasing hydraulic cylinder 1115 and how it is mounted in relation to mounting arm 1114 and harrow supporting arm 1113, as discussed above. Tool bar 1006 supports both rephasing hydraulic cylinder 1115 and mounting arm 1114. Hydraulic cylinder 1115 is pivotally connected to the supporting arm 1113 at pivot point 1116 and pivotally connected to tool bar 1006 at pivot point 1118 on bracket 1119 mounted on tool bar 1006. The hydraulic cylinders also comprise hydraulic fluid couplings in fluid communication with a hydraulic circuit and the hydraulic cylinder for providing hydraulic fluid to and receiving hydraulic fluid from the hydraulic cylinder. Hydraulic pressure can be used to retract or extend piston rod 1117 as desired, where retraction of piston rod 1117 causes tool bar 1006 to lower thereby engaging the rotary harrow with the ground while extension of piston rod 1117 raises tool bar 1006 thereby lifting the rotary harrow from the ground. Mounting arm 1114 is pivotally mounted on arm pivot 1112 at pivot point 1109, arm pivot 1112 being rigidly mounted on tool bar 1006. Two helical tension springs 1120 connect tool bar 1006 to mounting arm 1114. When hydraulic cylinder 1115 retracts and lowers tool bar 1006, the rotary harrow at the end of mounting arm 1114 engages the ground forcing mounting arm 1114 to pivot upward around pivot point 1109. Because the springs 1120 connect tool bar 1106 to mounting arm 1114, the pivoting of mounting arm 1114 causes springs 1120 to stretch. The stretching is more clearly illustrated in FIG. 17A and FIG. 17B. Springs 1120 are connected to tool bar 1006 through flanges 1121 welded to the tool bar. Springs 1120 are connected to mounting arm 1114 through hooks 1122 bolted to flange 1123 welded to mounting arm 1114.

Figure 17A:
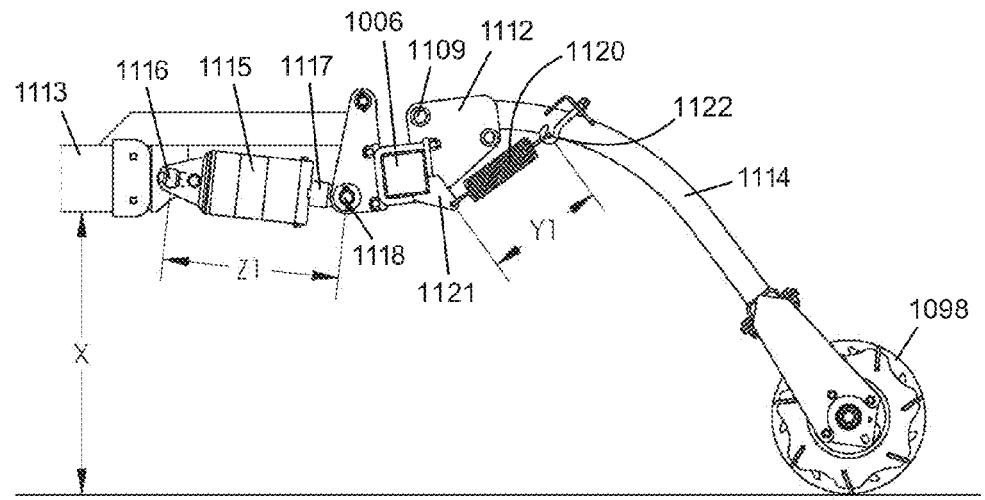
FIG. 17A is a side view showing a hydraulic cylinder, helical tension spring and mounting arm with rotary harrow mounted on a tool bar, where the hydraulic cylinder is partially extended and the harrow is on flat ground.
Figure 17B:
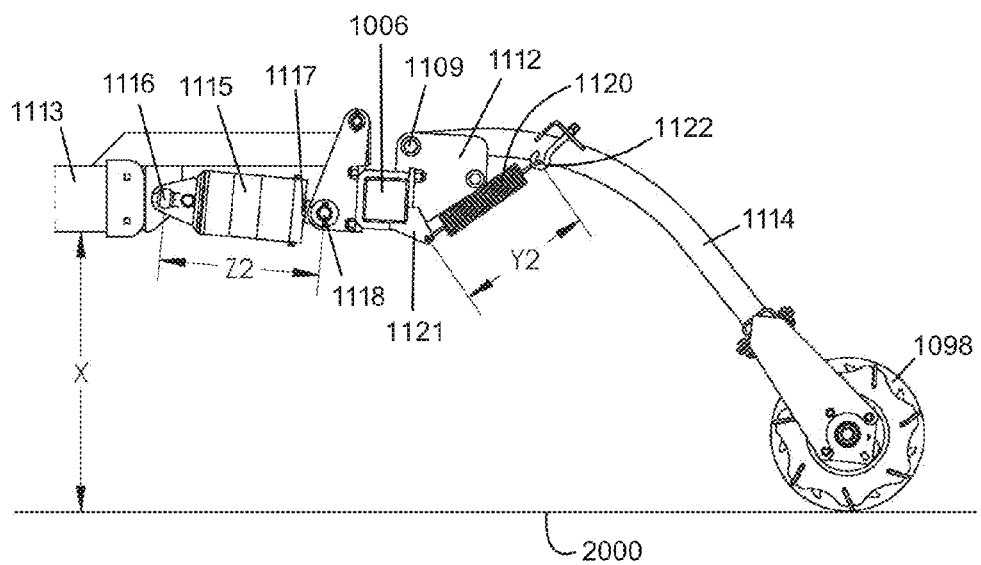
FIG. 17B is the same view as FIG. 17A with the hydraulic cylinder fully retracted.

FIG. 17A and FIG. 17B illustrate the effect of retraction of piston rod 1117 of hydraulic cylinder 1115 when rotary harrow 1098 is engaged with ground 2000. As shown in FIG. 17A, with piston rod 1117 in a partially retracted state, rotary harrow 1098 is engaged with ground 2000 under a specific force related to the pressure in hydraulic cylinder 1115. Total length of the hydraulic cylinder 1115 from pivot point 1116 to pivot point 1118 is Z1 and total length of helical tension spring 1120 from flange 1121 to hook 1122 is Y1. Supporting arm 1113 is a distance X off the ground. When piston rod 1117 is further retracted so that the total length of hydraulic cylinder 1115 is Z2 as shown in FIG. 17B, tool bar 1006 is forced down thereby increasing the downward force on rotary harrow 1098 engaged with the ground 2000. Because rotary harrow 1098 has no space to move downward, the increased downward force causes mounting arm 1114 to pivot upward at pivot point 1109 on arm pivot 1112. Upward pivoting of mounting arm 1114 causes spring 1120 to stretch to length Y2. Increased tension in the spring 1120 due to stretching increases downward bias forces on the harrow 1098, thus forces generated by the pressure change in hydraulic cylinder 1115 between FIG. 17A and FIG. 17B are transferred to the spring 1120, which in turn acts on mounting arm 1114 and therefore rotary harrow 1098 at the end of mounting arm 1114. Thus, pressure control in hydraulic cylinder 1115 controls the force at which rotary harrow 1098 engages the ground. Hydraulic pressure and therefore ground engaging force of the harrow 1098 may be controlled remotely, for example from the cab of a vehicle pulling the tillage apparatus, to adjust for field conditions. It can be seen from FIG. 17A and FIG. 17B that the distance X of the supporting arm 1113 off the ground does not change, therefore the action of hydraulic cylinder 1115 does not unduly affect the cultivator frame to which supporting arm 1113 is mounted.

Figure 18A:
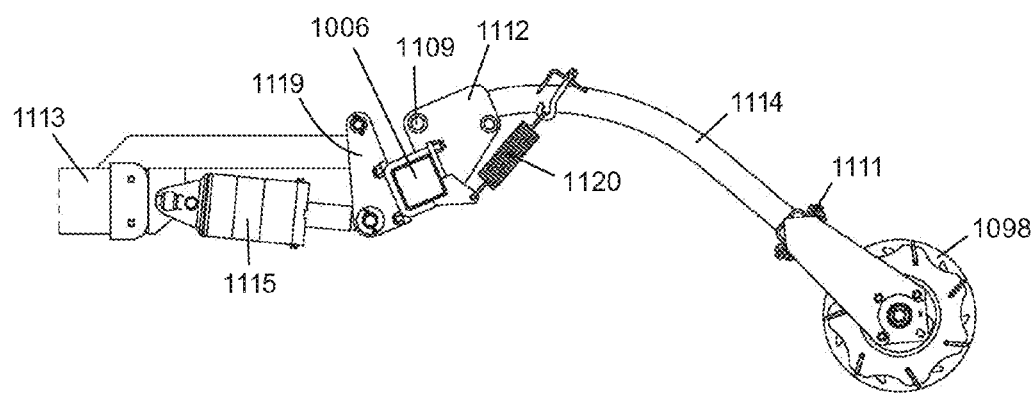
FIG. 18A is a side view showing a hydraulic cylinder, helical tension spring and mounting arm with rotary harrow mounted on a tool bar, where the hydraulic cylinder is fully extended to raise the harrow off the ground.
Figure 18B:
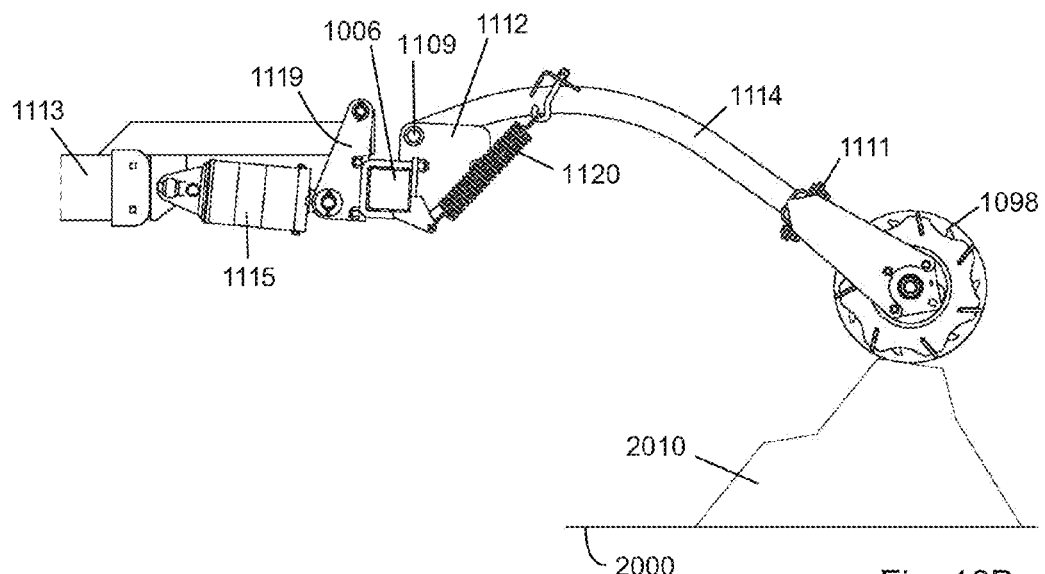
FIG. 18B is the same view as FIG. 18A with the hydraulic cylinder fully retracted for maximum ground engaging force while the harrow is being deflected by a rock.

FIG. 18A and FIG. 18B illustrate the difference in arrangement of hydraulic cylinder 1115, tool bar 1006 and helical tension spring 1120 when rotary harrow 1098 is simply lifted off ground 2000 (FIG. 18A) as opposed to being deflected upward by rock 2010 during operation (FIG. 18B). As seen in FIG. 18A, when hydraulic cylinder 1115 is fully extended, tool bar 1006 is maximally raised and arm pivot 1112 is also maximally raised by virtue of being welded to tool bar 1006. Mounting arm 1114 is free to pivot down around pivot point 1109 and is only prevented from pivoting down to the ground by stop pin 1125 extending from one side to the other of arm pivot 1112 underneath mounting arm 1114 Helical tension spring 1120 remains unstretched because there is no upward pivoting of mounting arm 1114. In FIG. 18B, hydraulic cylinder 1115 is fully retracted; therefore tool bar 1006 and arm pivot 1112 are maximally lowered for full engagement of rotary harrow 1098 with ground 2000. However, because harrow 1098 has struck rock 2010, harrow 1098 has deflected upward to the same height off the ground as depicted for the harrow in FIG. 18A. However, in FIG. 18B, deflection of harrow 1098 causes mounting arm 1114 to pivot upward while tool bar 1006 and arm pivot 1112 remain maximally lowered because the pressure in hydraulic cylinder 1115 is locked and tool bar 1006 is rigidly mounted to the cultivator frame through bracket 1119 rigidly connected to supporting arm 1113, which in turn is rigidly mounted to the cultivator frame. Upward pivoting of mounting arm 1114 must then cause stretching of spring 1120, which buffers the deflection of harrow 1098 while simultaneously urging harrow 1098 to return to the ground 2000 after clearing rock 2010. The action of spring 1120 is therefore two-fold, the first being to transfer downward forces to rotary harrow 1098 to keep the harrow engaged with the ground, and the second being to buffer upward forces cause by upward deflection of the harrow when the harrow strikes a hard impediment. It should be noted that rubber inserts between the basket arm of the harrow basket and basket mounting bracket 1111 at the end of mounting arm 1114 are also present to absorb deflection forces as described above.

Figure 19:
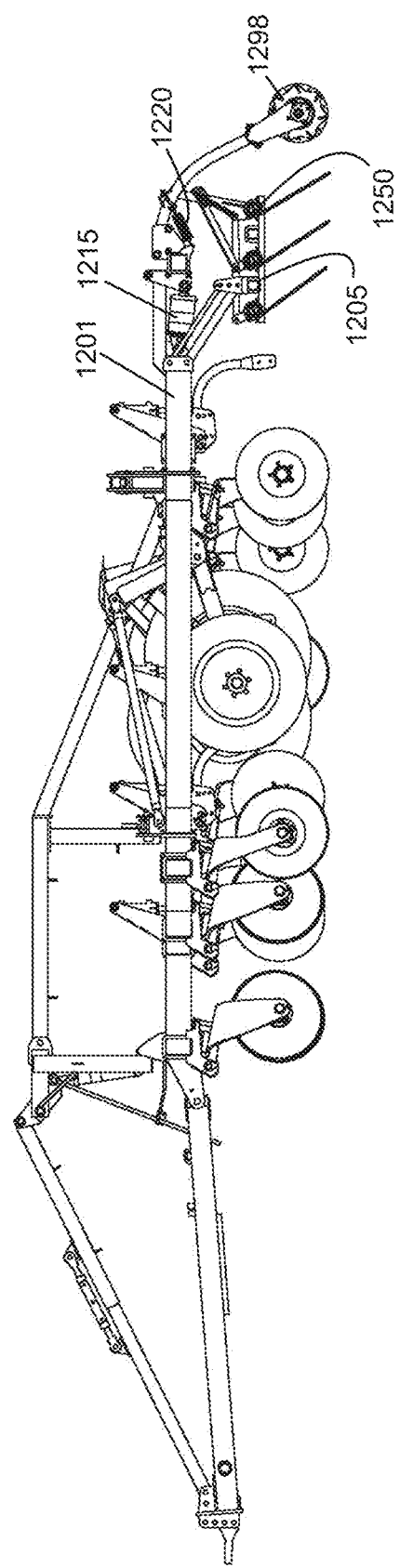
FIG. 19 is a side view of another embodiment of a tillage apparatus of the present invention having harrow assemblies mounted to a transverse frame-member at a rear of a cultivator frame of the tillage apparatus and utilizing helical tension springs as pressure relief elements; and, FIG. 20 is a schematic diagram of a hydraulic circuit for use with rephasing hydraulic cylinders in controlling a rotary harrow in the present invention.

FIG. 19 shows another embodiment of a tillage apparatus of the present invention utilizing rephasing hydraulic cylinders 1215 and helical tension springs 1220. The operation of the hydraulic cylinders 1215 and helical tension springs 1220 are as described for the embodiment of FIG. 14. Unlike the embodiment of FIG. 14, the embodiment of FIG. 19 has harrow assemblies 1298 mounted to a transverse frame-member at a rear of cultivator frame 1201 separately from a subframe 1205 supporting a set of spike harrows 1250 (only one labeled). In this respect, the embodiment of FIG. 19 is similar to the embodiment of FIG. 1.

Figure 20:
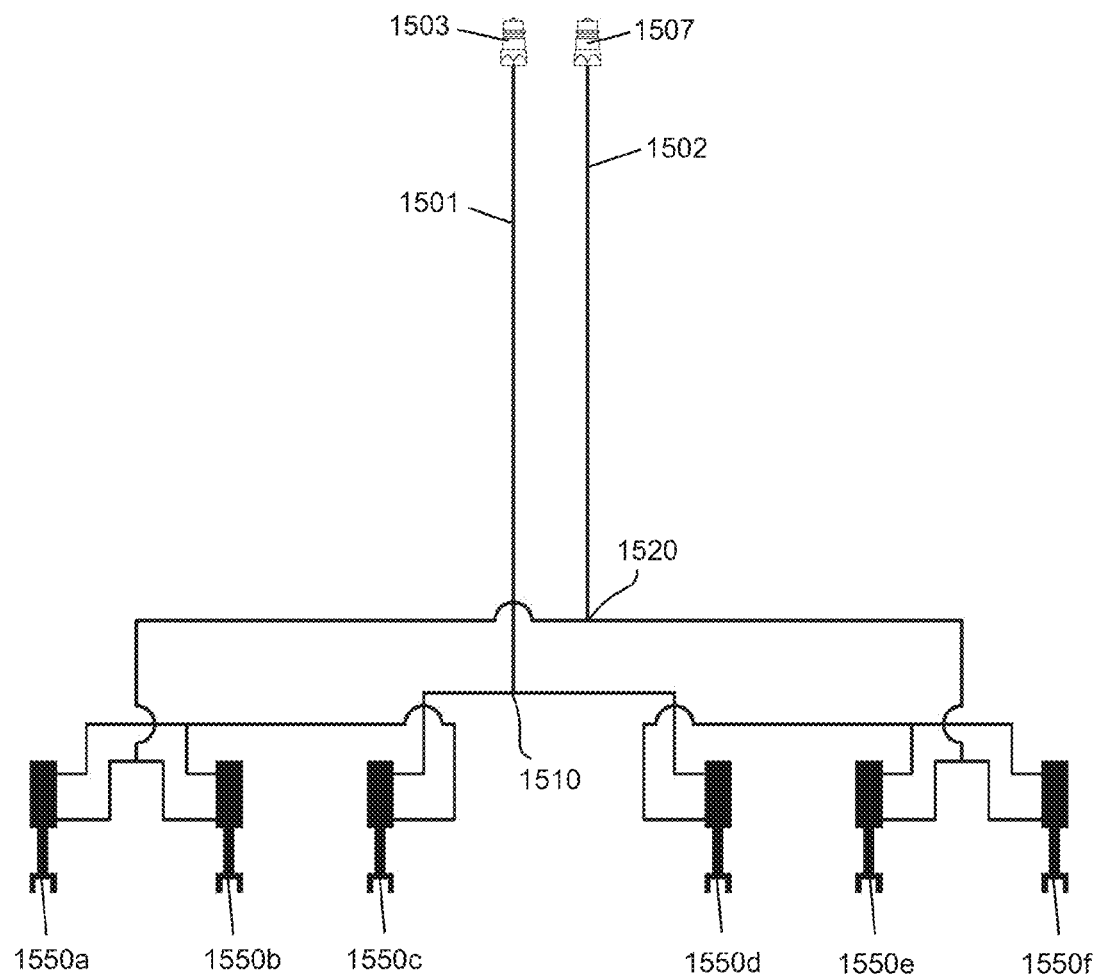

FIG. 20 is a schematic diagram of a hydraulic circuit for use with rephasing hydraulic cylinders in controlling a rotary harrow in the embodiments of FIG. 14 and FIG. 19. The circuit comprises a plurality of hydraulic lines containing hydraulic fluid for transmitting hydraulic pressure to six rephasing hydraulic cylinders 1550*a-f*. Cylinders 1550*a*, 1550*b* control a tool bar for a first rotary harrow, cylinders 1550*c*,1550*d* control a common tool bar for second and third rotary harrows, and cylinders 1550*e*,1550*f* control a tool bar for a third rotary harrow. The cylinders are shown extended, meaning that the harrow is disengaged from the ground. Cylinders 1550*a-f* are connected in series. Under normal operation to extend the cylinders 1550*a-f*, hydraulic fluid pressure is transmitted to the circuit from a hydraulic supply and a hydraulic pump on a tractor through a feed line coupled with coupling 1503 to hydraulic line 1501. Fluid flow is split left and right at line junction 1510. Fluid flowing left passes through cylinders 1550*c*, 1550*b* and 1550*a* before returning to line junction 1520 and then back via hydraulic line 1502 to coupling 1507 connected to a return line for returning hydraulic fluid to the hydraulic supply. Likewise, fluid flowing right passes through cylinders 1550*d*, 1550*e* and 1550*f* before returning to line junction 1520 and then back via hydraulic line 1502 to coupling 1507 connected to a return line for returning hydraulic fluid to the hydraulic supply. Retracting the cylinders 1550*a-f* may be accomplished by reversing the fluid low in the hydraulic circuit. Cylinders 1550*c* and 1550*d* are preferably tied together so that hydraulic fluid arriving at line junction 1510 from line 1501 (or line junction 1520 from line 1502) is distributed evenly between the two sides of the hydraulic circuit even if there may be a difference in load on the two sides of the harrow. The cylinders 1550*c* and 1550*d* may be tied hydraulically, mechanically or by any other suitable means.

In operation, the cylinders 1550*a-f* are retracted and the fluid pressure is set at a desired value for field conditions. The actual pressure will depend on system parameters, for example the internal diameter of the hydraulic lines. Provided one or more of the rotary harrows does not strike a hard object, the cylinders will remain retracted and the rotary harrows will remain in constant engagement with the ground under a fixed force. It is particularly useful that the fluid pressure may be set remotely, for example from the cab of the vehicle dragging the tillage apparatus.

The novel features of the present invention will become apparent to those of skill in the art upon examination of the detailed description of the invention. It should be understood, however, that the scope of the claims should not be limited by the preferred embodiments set forth in the examples, but should be given the broadest interpretation consistent with the specification as a whole.

The invention claimed is:

1. A tillage apparatus for tilling ground, the tillage apparatus comprising a cultivator frame and a rotary harrow mounted to the frame, the rotary harrow comprising a basket and at least one rotating harrow structure mounted in the basket, the basket mounted to a mounting element with compressible material at the mounting element, the compressible material permitting relative motion between the basket and the mounting element in response to a motion of the rotary harrow, the mounting element mounted to the frame, the mounting element operatively connected to a hydraulic actuator whose operation raises and lowers the mounting element thereby raising and lowering the rotary harrow, the hydraulic actuator operated under a first pressure to lower the rotary harrow and maintain engagement of the rotary harrow with the ground, and a pressure relief element for reducing back pressure caused by deflection of the rotary harrow.

2. The apparatus according to claim 1, wherein the compressible material comprises an elastomer.

3. The apparatus according to claim 1, wherein the compressible material comprises a rubber having a Shore A hardness in a range of 55-100.

4. The apparatus according to claim 1, wherein the mounting element comprises a mounting arm, the basket is mounted to the mounting arm through a mounting bracket and the compressible material is between the mounting bracket and the basket or between the mounting bracket and the mounting arm.

5. The apparatus according to claim 1, wherein the basket is mounted to two mounting elements and the two mounting elements are operatively connected to two hydraulic actuators.

6. The apparatus according to claim 1, wherein the pressure relief element comprises a relief valve in fluid communication with the hydraulic actuator, the relief valve set at a second pressure greater than the first pressure to permit flow of hydraulic fluid out of the hydraulic actuator when fluid pressure in the hydraulic actuator exceeds the second pressure.

7. The apparatus according to claim 6, wherein the basket is mounted to one mounting element and the mounting element receives one hydraulic actuator.

8. The apparatus according to claim 1, wherein the hydraulic actuator comprises a double acting hydraulic cylinder.

9. The apparatus according to claim 6, wherein the relief valve comprises hydraulic circuitry that allows hydraulic fluid to flow back into the hydraulic actuator after having flowed out of the hydraulic actuator.

10. The apparatus according to claim 6, further comprising a hydraulic accumulator for buffering an increase in fluid pressure in response to the motion of the rotary harrow.

11. The apparatus according to claim 6, further comprising one or more additional pressure relief mechanisms.

12. The apparatus according to claim 11, wherein the one or more additional pressure relief mechanisms are one or more additional hydraulic accumulators and/or additional relief valves.

13. The apparatus according to claim 1, wherein the pressure relief element comprises a resilient member mounted to the mounting element, the resilient member configured to transfer ground engaging forces generated by the hydraulic cylinder to the rotary harrow and configured to resiliently deform to reduce back pressure caused by deflection of the rotary harrow.

14. The apparatus according to claim 13, wherein the resilient member comprises a helical tension spring.

15. The apparatus according to claim 13, wherein the pressure in the hydraulic actuator is locked at the first pressure.

16. The apparatus according to claim 13, wherein the hydraulic actuator comprises two or more rephasing hydraulic cylinders.

17. The apparatus according to claim 16 comprising a plurality of rephasing hydraulic cylinders plumbed in series.

18. The apparatus according to claim 1, comprising a plurality of rotary harrows mounted on the frame with mounting elements.

19. The apparatus according to claim 1, which is a conservation tillage apparatus.

20. A kit comprising: a cultivator frame; a rotary harrow comprising a basket and at least one rotating harrow structure mounted in the basket; a hydraulic system including a hydraulic actuator, the hydraulic system able to provide a first pressure to the hydraulic actuator for lowering the rotary harrow and maintaining engagement of the rotary harrow with the ground; a mounting element for mounting the rotary harrow on the cultivator frame, the mounting element for operative connection to the hydraulic actuator; compressible material for permitting relative motion between the rotary harrow and the mounting element in response to a motion of the rotary harrow when the rotary harrow is mounted on the mounting element; a pressure relief element for reducing back pressure caused by deflection of the rotary harrow; and, a set of instructions for assembling the mounting element, rotary harrow, hydraulic system, compressible material and pressure relief element on the cultivator frame.

\* \* \* \* \*